US006222608B1

(12) United States Patent
Shindo et al.

(10) Patent No.: US 6,222,608 B1
(45) Date of Patent: Apr. 24, 2001

(54) IMAGE FORMING DEVICE FOR FORMING IMAGE ON ROLL OF PHOTOSENSITIVE/ PRESSURE-SENSITIVE RECORDING MEDIUM

(75) Inventors: Tatsuya Shindo; Masayuki Arakawa, both of Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 09/250,301

(22) Filed: Feb. 16, 1999

(30) Foreign Application Priority Data

Feb. 16, 1998 (JP) ........ 10-033116
Feb. 16, 1998 (JP) ........ 10-033117
Feb. 17, 1998 (JP) ........ 10-035088
Feb. 20, 1998 (JP) ........ 10-038861

(51) Int. Cl.$^7$ ........ G03B 29/00
(52) U.S. Cl. ........ 355/28; 355/31
(58) Field of Search ........ 355/27, 28, 40; 399/71, 320, 326

(56) References Cited

U.S. PATENT DOCUMENTS 4,085,926 4/1978 Post et al. .
4,837,602 6/1989 Tahara .
4,894,666 * 1/1990 Ishikawa et al. ........ 346/76
4,942,422 * 7/1990 Mashijo et al. ........ 355/28
4,945,383 * 7/1990 Kobayashi et al. ........ 355/30
5,049,921 9/1991 Sonobe et al. .
5,220,377 * 6/1993 Suzuki et al. ........ 355/27
5,394,605 * 3/1995 Fattori et al. ........ 29/563

FOREIGN PATENT DOCUMENTS 1-300256 12/1989 (JP) .

* cited by examiner

*Primary Examiner*—Safet Metjahic
*Assistant Examiner*—E P LeRoux
(74) *Attorney, Agent, or Firm*—Oliff & Berridge, PLC

(57) ABSTRACT

A rotary blade cuts a photosensitive/pressure-sensitive recording medium by when slides in a widthwise direction of the recording medium. At this time, one terminal of an optical fiber moves ahead of the rotary blade while radiating an optical beam on a portion of the recording medium, so that microcapsules of the recording medium in the exposed portion are all hardened by react to the optical beam. Therefore, mechanical stress generated by the rotary blade does not rupture the microcapsules.

14 Claims, 20 Drawing Sheets

IMAGE FORMING DEVICE FOR FORMING IMAGE ON ROLL OF PHOTOSENSITIVE/ PRESSURE-SENSITIVE RECORDING MEDIUM

BACKGROUND OF THE INVENTION

1. Field of the Invention

The present invention relates to an image forming device for forming an image on a roll of photosensitive/pressure-sensitive recording medium.

2. Description of the Related Art

There has been known an image forming device for forming an image on a roll of photosensitive/pressure-sensitive recording medium that includes microcapsules with dye precursor. In this kind of image forming device, the roll of recording medium is cut down to a predetermined output size by a cutter, which is located at a cutting position. Then, an exposure unit exposes the cut recording medium to a light of a certain wavelength. The microcapsules selectively harden by reacting to the light, and a latent image is formed in the recording medium accordingly. Then, a pair of pressing rollers of a developing unit apply pressure to the recording medium sandwiched therebetween. As a result, unhardened microcapsules are ruptured, and dye precursor exudes from the ruptured microcapsules, thereby developing an image corresponding to the latent image. Afterwards, the image is thermally fixed by a fixing unit.

However, when the recording medium is cut down to the output size, adhesive materials included in the recording medium exude from the cut surface and adhere onto the cutter. The adhesive materials will gradually accumulate on the cutter until eventually the cutter becomes unable to cut the recording medium.

Also, mechanical stress is applied to the recording medium during the cutting operation. This ruptures the microcapsules around the portion of the recording medium, so that the cutting portion of the cut recording medium may be developed in an undesirable color, thereby degrading quality of the developed image.

In order to overcome this problem, there has been proposed an image forming device including the cutting unit shown in FIG. 1. In this image forming device, an exposure unit 850 exposes a cut portion of a recording medium 810 with white light from the above. Then the recording medium 810 is cut along the exposed cut portion by the cutter 840. More specifically, as shown in FIG. 1, a linear light source 820 emits white light. The light source 820 extends to a greater length than the width of the recording medium 810. The light emitted from the light source 820 reaches the recording medium 810 through a slit 830 having a predetermined width. Because the cutter 840 cannot be positioned directly below the light source 820, the cutter 840 is located at a position remote from the exposure unit 840. Therefore, the recording medium 810 is transported to a cutting position after the exposure operation. The recording medium 810 is placed between a pair of blades 840*a*, 840*b*, and cut along the exposed cutting portion. Because the microcapsules at the exposed cutting portion of the recording medium 810 are all hardened, the microcapsules will not be undesirably ruptured at the cutting operation. Therefore, a high quality image can be provided.

However, the recording medium 810 may be inaccurately transported from the through hole to the cutting position because the feeding mechanism slips or for some other reason. If the cutting portion is exposed to only a narrow width, then when the recording medium 810 is inaccurately transported, it may be cut in front or behind the exposed cutting portion. Therefore, the exposed cutting portion must be formed to have a certain wide width. However, the an image cannot be formed on the exposed cutting portion, so the recording medium 810 is wasted when the cutting portion is formed wide.

Also, because the recording medium 810 is first exposed with a light, transported to the cutting position, and then cut by the cutter 840, the overall operation takes a relatively long time. Also, because the exposure unit 850 and the cutter 840 are positioned separated from each other, the image forming device has a relatively large size.

Moreover, because a recording medium has a certain thickness, a large shock is applied to the developing unit when the recording medium is first inserted in between the pressing rollers and later discharged from between the pressing rollers. This large shock can produce a loud noise, and can also affect the developing unit, thereby reducing the life of the developing unit.

In order to overcome this problem, Japanese Patent-Application Publication No. HEI-1-300256 discloses a mechanism for cutting down a recording medium at a predetermined angle with respect to a feed direction of the recording medium. That is to say, the recording medium is cut perpendicular to a surface of the recording medium, but at a slant with respect to a widthwise direction of the recording medium. When the recording medium cut in this manner is inserted in between the pressing rollers, a leading edge of the recording medium is gradually inserted in between the pressing rollers, so that the shock is less than in the situation described above. The same is the case when the rear edge of the recording medium is discharged from between the pressing rollers.

However, in this case, when the recording medium is cut at a slant in this manner, the surface area of the portion sandwiched between the pressing rollers will change gradually when the edge portions enter or leave the pressing rollers. Therefore, the pressure per unit surface area on the leading and rear edge portions of the recording medium changes in association with distance that the recording medium is transported. Microcapsules are ruptured in varying amounts depending on pressure applied, so that the color of the developed image will be uneven.

Also, the amount of compression energy that accumulates on the rear edge of the recording medium is much greater than at positions where the width is wider. As a result, the recording medium can fly out of the developing unit with a popping or other an unusual sound. Therefore, pressing development can be sometimes insufficient.

SUMMARY OF THE INVENTION

It is an objective of the present invention to overcome the above-described problems and to provide a photosensitive/pressure-sensitive image forming device including a cleaning unit for cleaning that cutting unit.

It is another objective of the present invention to provide a photosensitive/pressure-sensitive image forming device capable of forming a high quality image without undesirable color developed therein or unevenness in color.

It is also another objective of the present invention to provide an economical and small-sized photosensitive/pressure-sensitive image forming device capable of quickly performing an image forming operation without wasting recording medium.

It is still another objective of the present invention to provide a photosensitive/pressure-sensitive image forming device wherein shock generated when a recording medium enters and leaves a developing unit is reduced, and wherein energy does not accumulate at rear edges of the recording medium, so the recording medium does not fly out of the developing unit.

In order to achieve the above and other objectives, there is provided an image forming device including a cutting unit that cuts a recording medium and a cleaning member that cleans the cutting unit when the cutting unit comes into contact with the cleaning member.

There is also provided an image forming device including a cutting unit that cuts a recording medium and a supply unit that supplies the cutting unit with one of an agent that prevents a foreign material from clinging to the cutting unit and an agent that dissolves an adhesive material contained in the recording medium.

Also, there is provided an image forming device including a transport unit that transports a photosensitive/pressure-sensitive recording medium in a first direction, a frame extending in a second direction perpendicular to the first direction, a cutting unit that is slidably supported on the frame and cuts down the photosensitive/pressure-sensitive recording medium by sliding along the frame, and an exposure unit that radiates white light onto a portion of the photosensitive/pressure-sensitive recording medium. The exposure unit is attached to the cutting unit such that when the cutting unit slides in the second direction, the exposure unit moves with and ahead of the cutting unit while radiating the white light onto the portion of the photosensitive/pressure-sensitive recording medium.

Further, there is provided an image forming device including an exposure unit, a cutting unit, and a transport unit. The exposure unit exposes an optical image having an exposure region onto a photosensitive/pressure-sensitive recording medium positioned at an exposure position to form a latent image corresponding to the optical image in the photosensitive/pressure-sensitive recording medium. The latent image has an image region. The photosensitive/pressure-sensitive recording medium having an elongated shape. The cutting unit cuts the photosensitive/pressure-sensitive recording medium at a portion within the image region down into a predetermined output size. The transport unit transports the photosensitive/pressure-sensitive recording medium from the exposure position toward the cutting unit.

Still further, there is provided an image forming device including a transporting unit that transports in a first direction a pressuresensitive recording medium having a thickness in a second direction perpendicular to the first direction and a cutting unit that cuts the pressure-sensitive recording medium in a third direction perpendicular to the first direction and at a slant with respect to the second direction.

BRIEF DESCRIPTION OF THE DRAWINGS

The particular features and advantages of the invention as well as other objects will become more apparent from the following description taken in connection with the accompanying drawings, in which:

FIG. 14(*b*) is a front view of the slide cutter of FIG. 14(*a*);

FIG. 15(*b*) is a front view of the slide cutter of FIG. 15(*a*);

FIG. 19(*b*) is a front view of the cutting unit of FIG. 19(*a*);

FIG. 20(*b*) is a front view of the cutting unit of FIG. 20(*a*);

FIG. 21(*b*) is a front view of the cutting unit of FIG. 21(*a*);

FIG. 22(*b*) is a front view of the cutting unit of FIG. 22(*a*);

FIG. 27(*b*) is an plan view of the recording medium positioned at a cutting position;

FIG. 27(*c*) is an plan view of the recording medium cut at the cutting position;

FIG. 27(*d*) is an plan view of the recording medium returned to the through hole;

FIG. 27(*e*) is an plan view of the recording medium exposed with an optical image;

FIG. 28(*b*) is an plan view of the recording medium at a cutting position;

FIG. 28(*c*) is an plan view of a wasted part of the recording medium being cut away;

FIG. 28(*d*) is an plan view of the recording medium transported to a cutting position;

FIG. 28(*e*) is an plan view of the recording medium cut at the cutting position;

FIG. 29(*b*) is an plan view of the recording medium exposed with an optical image;

FIG. 29(*c*) is an plan view of the recording medium transported to the cutting position;

FIG. 29(*d*) is an plan view of the recording medium with a wasted portion cut off from the recording medium;

FIG. 29(*e*) is an plan view of the recording medium transported to the cutting position; and FIG. 29(*f*) is an plan view of the recording medium cut down into an output size.

DETAILED DESCRIPTION OF THE PREFERRED EMBODIMENTS

Image forming devices according to preferred embodiments of the present invention will be described while referring to the accompanying drawings. In the following description, the expressions "front", "rear", "left", "right", "upper", "lower", "horizontal, and "vertical" are used throughout the description to define the various parts when the printer is disposed in an orientation in which it is intended to be used.

Figure 1:
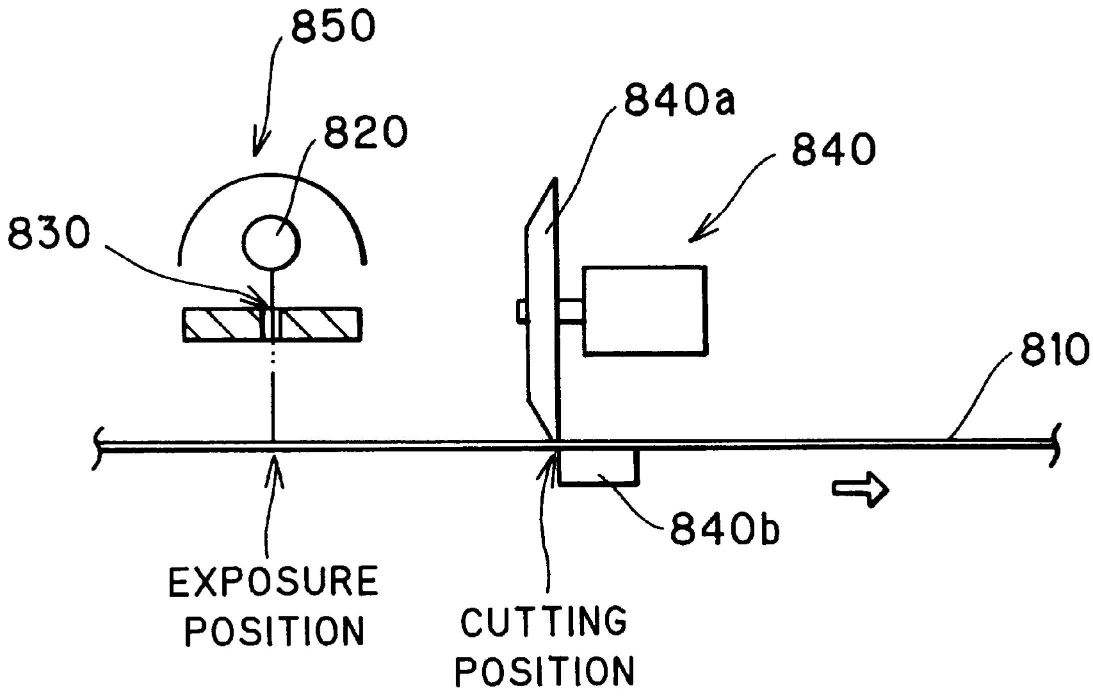
FIG. 1 PRIOR ART
FIG. 1 is a plan view showing a cutting unit and an exposing unit of a conventional photosensitive/pressure-sensitive image forming device.
Figure 2:
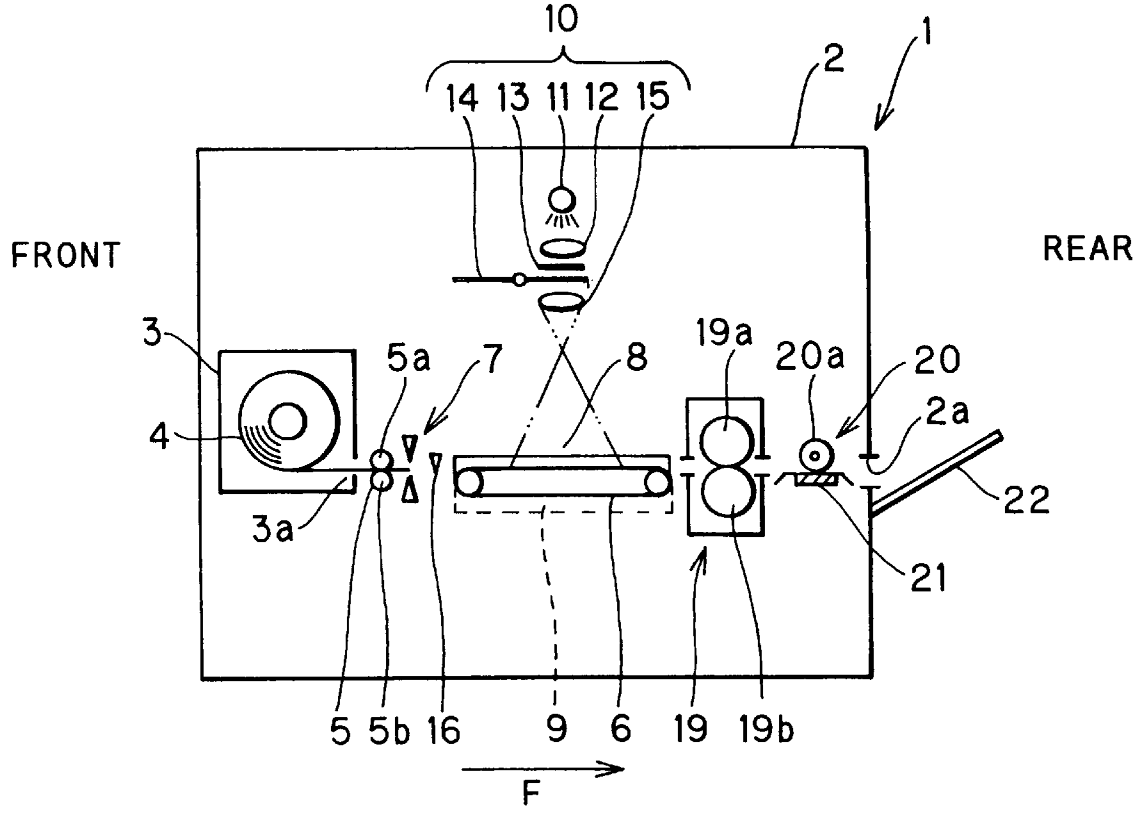
FIG. 2 is a plan view showing a configuration of a printer according to a first embodiment of the present invention.

First, a configuration of a photosensitive/pressure-sensitive printer 1 according to a first embodiment of the present invention will be described while referring to FIGS. 2 to 7. As shown in FIG. 2, the photosensitive/pressure-sensitive printer (hereinafter referred to as "printer") 1 includes a frame 2, a cassette 3, a feed unit 5, a transfer belt 6, a cutting unit 7, a pressing glass 8, a support 9, an exposure unit 10, a sheet edge detection sensor 16, a developing unit 19, a fixing unit 20, and a discharge tray 22. The frame 2 is formed with a discharge port 2*a*. The cassette 3 is formed with an opening 3*a* and detachably mounted to a front side of the printer 1. The cassette 3 houses an elongated photosensitive/pressure-sensitive recording medium (hereinafter referred to as "recording medium") 4 wound in a rolled-up condition.

The cassette 3, the feed unit 5, the sheet edge detection sensor 16, the support 9, the developing unit 19, and the fixing unit 20 are all provided in the frame 2 in this order in a feed direction indicated by an arrow F. A leading portion of the recording medium 4 is drawn out from the cassette 3 through the opening 3*a*. The feed unit 5 includes a pair of feed rollers 5*a* and 5*b* for feeding the recording medium 4. The cutting unit 7 cuts the recording medium 4 down into a predetermined output size. The cutting unit 7 detects a leading edge of the recording medium 4. The support 9 supports the recording medium 4 thereon at an image exposure operation to be described later.

The pressing glass 8 is made in a plate shape from transparent glass that light can pass through. The support 9 is positioned below the pressing glass 8 and provided with a transport belt 6. The transfer belt 6 is controlled to selectively press against and separate from an under surface of the pressing glass 8. During a medium transport operation, the transfer belt 6 is separated from the under surface of the pressing glass 8, and driven to rotate in order to transport the recording medium 4 interposed between the transfer belt 6 and the pressing glass 8. On the other hand, during an image exposure operation, the transport belt 6 presses the recording medium 4 against the under surface of the pressing glass 8 in order to to keep the recording medium 4 flat.

The exposure unit 10 forms an optical image onto the recording medium 4. The exposure unit 10 includes a light source 11, such as a halogen lamp, a condenser lens 12, a liquid crystal panel 13, a filter member 14, and a focus lens 15. The light source 11 emits white light. The condenser lens 12 condenses the white light emitted from the light source 11. The liquid crystal panel 13 displays an exposure image based on print data. Although not shown, the filter member 14 includes three color filters: red, blue, and green. The filter member 14 is rotatable and so can selectively move the color filters in between the panel 13 and the lens focus lens 15.

White light from the light source 11 passes through the liquid crystal panel 13, and is formed into an optical image corresponding to the exposure image of the liquid crystal panel 13. Then, the optical image passes through one of the color filters, and is formed into an optical image having a wavelength that corresponds to a certain optical component, that is, a blue light component, a red light component, or a green light component. A light component of the optical image is determined by the color of the filter which the optical image has passed through. The filter member 14 is controlled to rotate so as to produce an optical component for a desired time duration. The focus lens 15 condenses the optical image to a predetermined focal point distance. When the condensed optical image reaches and irradiates the recording medium 4 through the pressing glass 8, microcapsules in the recording medium 4 selectively react to the optical image and harden. As a result, a latent image corresponding to the optical image is formed in the recording medium 4.

The developing unit 19 includes a pair of pressing rollers 19*a*, 19*b* for applying pressure to the recording medium 4 in order to develop an image corresponding to a latent image. The developing unit 19 includes an upper roller 19*a* and the lower roller 19*b*. The lower roller 19*b* is supported by the frame 2 so as to be capable of selectively contacting and separating from the upper roller 19*a*, and urged upwardly by a resilient member (not shown), such as a spring. The developing unit 19 applies pressure to the recording medium 4 by sandwiching between the upper roller 19*a* and the lower roller 19*b* to crush unhardened microcapsules contained in the microcapsules sheet 4.

The fixing unit 20 includes a fixing heater 21 and a pressing roller 20*a*. The fixing heater 21 generates heat to increase its temperature to a predetermined temperature. The pressing roller 20*a* urges the recording medium 4 against the fixing heater 21. When the recording medium 4 formed with the developed image is transported through the fixing unit 20, neat from the fixing heater 21 thermally fixes the developed image onto the recording medium 4. In this way, a long lasting image can be formed on the recording medium 4.

The discharge tray 22 is provided on an outer surface of the frame 2 at a position below the discharge port 2*a* for supporting the discharged recording medium 4.

Figure 3:
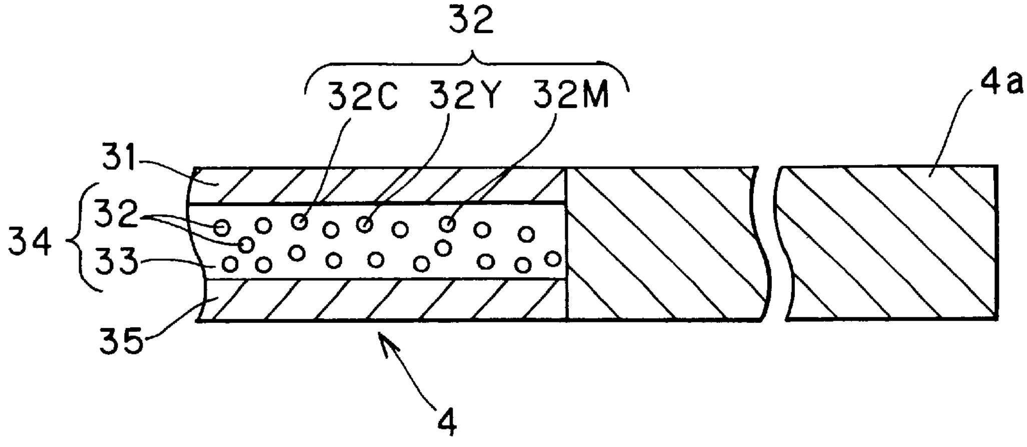
FIG. 3 is a cross-sectional view of a photosensitive/pressure-sensitive recording medium used in the printer of FIG. 2.

Next, the recording medium 4 will be described while referring to FIG. 3. As shown in FIG. 3, the recording medium 4 includes a cover sheet 31, a base sheet 35, and a mixed layer 34 sandwiched between the cover sheet 31 and the base sheet 35. The mixed layer 34 includes microcapsules 32Y, 32M, 32C (collectively referred to as "microcapsule 32"), and developer 33. The microcapsules 32Y, 32M, 32C have a polymer wall and contain photosensitive resin and dye precursor. The photosensitive resin is reactive with a certain wavelength optical component, that is, a blue light component, a green light component, or a red light component. The type of dye precursor varies with the type of microcapsule 32Y, 32M, 32C. That is, the microcapsules 32Y, 32M, 32C contain yellow-color dye precursor, magenta-color dye precursor, and cyan-color dye precursor, respectively. The photosensitive resin changes its mechanical strength and hardens when exposed to a corresponding optical component. In this way, a latent image corresponding to an optical image is formed in the recording medium 4. When, the recording medium 4 with the latent image formed therein is subject to pressure, unhardened microcapsules 32 ruptures, and the dye precursor exudes from the microcapsule 32. The dye precursor reacts with the developer 33 into a corresponding primary color, that is, yellow, magenta, and cyan. In this way, an image corresponding to the latent image is developed in the recording medium 4.

Specifically, when the recording medium 4 is exposed to a blue light component having a wavelength of about 470 nm, the photosensitive resin of the microcapsules 35Y, which includes yellow-color dye precursor, hardens. Then, when the recording medium 4 is subject to pressure, the microcapsules 32M, 32C which include magenta-color dye precursor and cyan-color dye precursor, respectively, ruptures, but the microcapsules 32Y do not. As a result, the magenta-color dye precursor and the cyan-color dye precursor exude from the microcapsules 32M, 32C, react with the developer 33, and mix with each other to develop a blue color which is visible through the cover sheet 31.

When the recording medium 4 is exposed to a green light component having a wavelength of about 525 nm, the photosensitive resin of microcapsule 32M, which includes magenta-color dye precursor, hardens. When the recording medium 4 is subject to pressure, the microcapsules 32Y, 32C which include yellow-color dye precursor and cyan-color dye precursor, respectively, rupture, but the microcapsules 32M do not. As a result, the yellow-color dye precursor and the cyan-color dye precursor exude from the microcapsules 32Y, 32C, react with the developer 33, and mix with each other. As a result, green color is developed and becomes visible through the cover sheet 31.

When the recording medium 4 is exposed to a red light component having a wavelength of about 650 nm exposes, the photosensitive resin of the microcapsule 32C, which includes cyan-color dye precursor, hardens. When such recording medium 4 is subject to pressure, the microcapsules 32Y, 32C which include yellow-color dye precursor and magenta-color dye precursor, respectively, rupture, but the microcapsules 32M do not. As a result, the yellow-color dye precursor and the magenta-color dye precursor exude from the microcapsules 32Y, 32M, react with the developer 33, and mix with each other. As a result, red color is developed and becomes visible through the cover sheet 31.

When the recording medium 4 is exposed to white light, all of the microcapsules 32 harden. Therefore, non of the microcapsules 32 rupture even when subject to pressure. Therefore, color developing will not take place, and a white-colored upper surface of the base sheet 35 stays visible from above. That is, an image is formed where the color developing takes place, and the upper surface of the base sheet 35 provides a white-color background of a developed image. It should be noted that such color developing is called self coloring, and the surface of the base sheet 35 is called a developed surface.

It should be noted that the wall of the microcapsule 32 can be formed gelatin, polyamide, polyvinyl alcohol, or polyisocianate resin. The dye precursor can be triphenylmethan dye precursor or spiropyran. The photosensitive resin can be organic compound including acriloil, such as trimethylolpropanetriachrylate. The polymerization agent may be benzophenon, benzoylalkylether.

The developer 33 may be well-known acid developer, such as organic acid, phenolnovolac resin, and inorganic acid including acid white clay, kaolin, acid zinc, and acid titanium. The material for forming the developer 33 may be selected in accordance with the material forming dye precursor.

The base sheet 35 can be made of transparent, semitransparent, or opaque sheet, for example, resin film, paper (cellulose), synthetic paper, polyester, and polycarbonate.

The recording medium 4 including the microcapsules 32 is easily affected by humidity. When the recording medium 4 is left in a humid place, the recording medium 4 absorbs moisture through the cover sheet 31 and the base sheet 35. As a result, the photosensitivity of the recording medium 4 may increase as much as 10 times or greater. Therefore, the recording medium 4 needs to be protected from humidity for preventing the photosensitivity from changing.

In order to achieve this objective, it is preferable to form the cover sheet 31 and the base sheet 35 from a material having an anti-humidity property, or to apply anti-humidity material over inner or outer surfaces of the cover sheet 31 and the base sheet 35. Such anti-humidity material may be, for example, optical lens material, such as, amorphous polyolefin. Alternatively, silicon dioxide can be deposited over the surfaces.

Also, when the recording medium 4 is exposed to ultraviolet light, the ultraviolet light reaches the microcapsules 32 through the cover sheet 31, thereby turning the microcapsules 32 a yellowish color. As a result, whiteness and color density of the background of an image can be altered. Therefore, in order to overcome this problem, it is preferable to form the cover sheet 31 from a material having a low ultraviolet light transmittance. Alternatively, such low transmittance material can be applied onto an outer surface or inner surface of the cover sheet 31.

The mixed layer 34 of the medium 4 can be formed by applying a mixture of microcapsules 32, developer 33, binder, filler, and viscosity adjuster onto the base sheet 35 using an application roller, a sprayer, a doctor knife, or other suitable tool.

As shown in FIG. 3, the recording medium 4 is attached to a cleaning tape 4*a*. The cleaning tape 4*a* is formed consecutive with the recording medium 4 and serves as a leader tape of the recording medium 4. Although not shown in the drawings, a reflection rate detection sensor is provided adjacent to the cutting unit 7. Because the cleaning tape 4*a* has a different reflection rate than the recording medium 4, the reflection rate detection sensor can distinguish between the cleaning tape 4*a* and the recording medium 4. The cleaning tape 4*a* is formed from a PET film containing a number of microcapsules. Each microcapsule contains methyl ethyl ketone which is a solvent capable of dissolving adhesive materials contained in the mixed layer 34 of the recording medium 4. When the cassette 3 is first mounted in the printer 1, the printer 1 controls the cutting unit 7 to cut the cleaning tape 4*a* so that adhesive materials clinging to cutting unit 7 is dissolved and removed.

Figure 4:
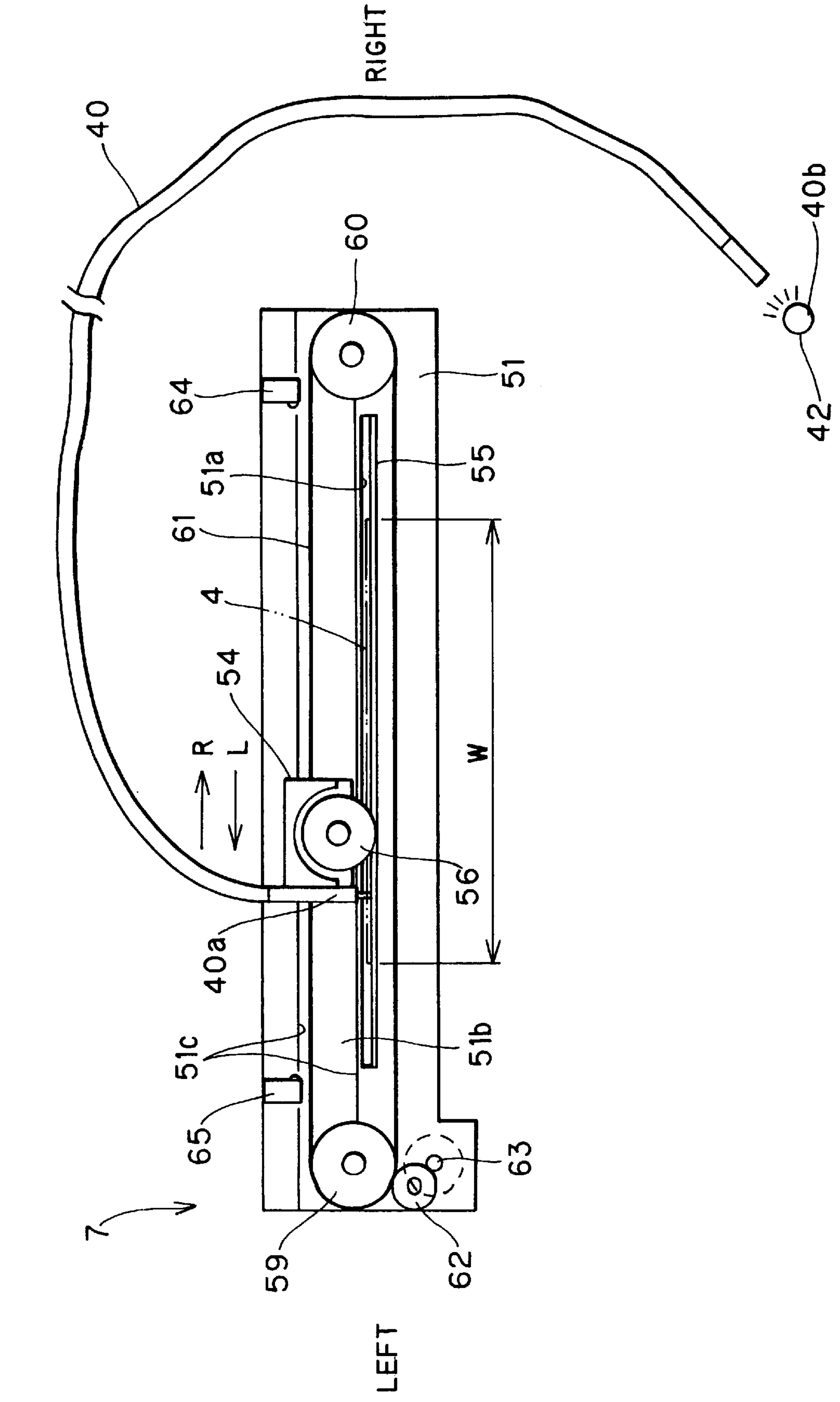
FIG. 4 is a plan view of a cutting unit according to a first embodiment of the present invention.

Next, the cutting unit 7 according to the first embodiment of the present invention will be described while referring to FIGS. 4 to 7. As shown in FIG. 4, the cutting unit 7 includes a frame 51, a holder 54, a sliding blade 56, a fixed blade 55, a driving pulley 59, a driven pulley 60, a wire 61, a gear 62, a reversible motor 63, a right sensor 64, a left sensor 65, and an optical fiber 40.

The frame 51 extends in right and left directions, and is formed with a through hole 51*a* and a groove 51*b*. The through hole 51*a* has a width and a height greater than a width W and a thickness of the recording medium 4, respectively. The through hole 51*a* is positioned on a sheet feed path of the recording medium 4, so that the recording medium 4 supplied from the feed unit 5 can pass therethrough.

Figure 5:
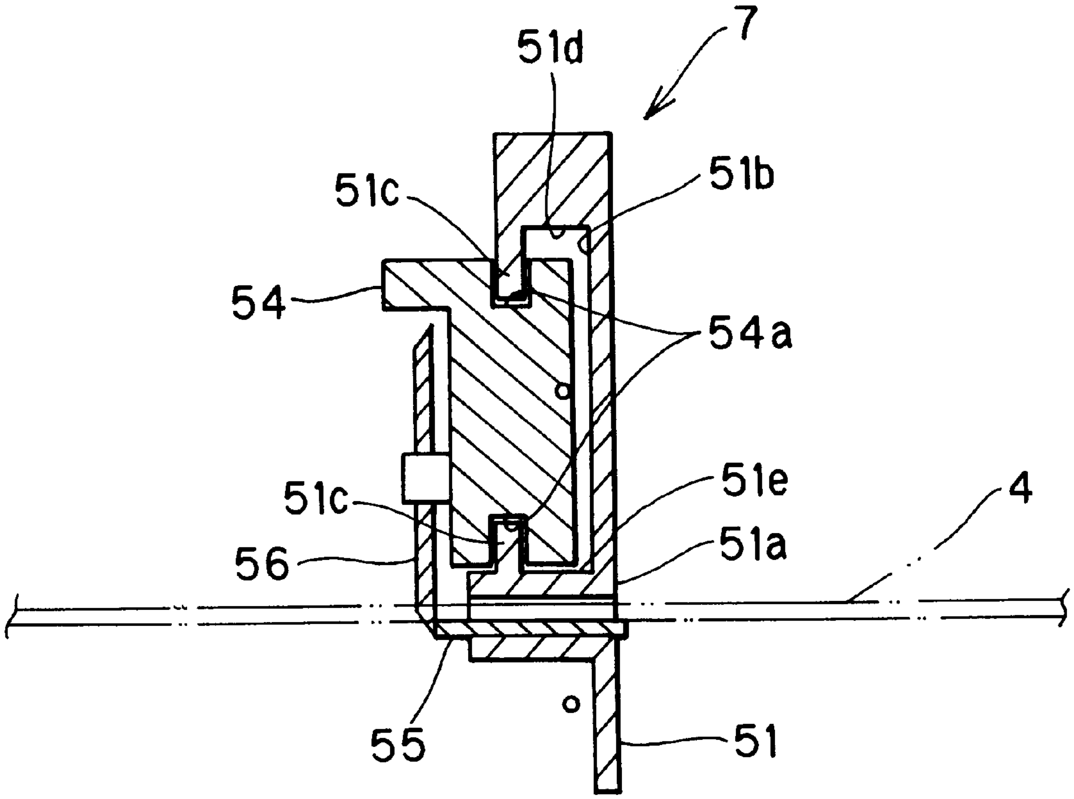
FIG. 5 is a cross-sectional view of the cutting unit of FIG. 4.

As shown in FIG. 5, the groove 51*b* is defined by an upper surface 51*d* and a lower surface 51*e*. Protrusions 51*c* are formed in upper and lower surfaces 51*d*, 51*e* so as to protrude vertically toward each other. The holder 54 is formed with engagement grooves 54*a* at its upper and lower surfaces for engaging the protrusions 51*c*. In this way, the holder 54 is slidably supported by the frame 51.

The sliding blade 56 is formed in a disk shape and is freely rotatably supported on a front surface of the holder 54 such that a lower portion of the sliding blade 56 is positioned below the through hole 51*a*. On the other hand, the fixed blade 55 is positioned on a lower surface of the through hole 51*a* such that the fixed blade 55 is almost in contact with a blade edge of the sliding blade 56.

The driving pulley 59 and the driven pulley 60 are provided at the right and left sides of the frame 51, respectively. The driving pulley 59 is connected to the reversible motor 63 via the gear 62 so that a driving force of the reversible motor 63 can be transmitted to the driving pulley 59. The wire 61 is wound around and extends between the pulleys 59, 60, and ends of the wire 61 are attached to corresponding right and left side surfaces of the holder 54. With this configuration, when the reversible motor 63 drives the driving pulley 59 to rotate, the holder 54 is moved between a predetermined slide start position and a predetermined slide end position either in a cutting direction indicated by an arrow L or a returning direction indicated by an arrow R depending on the rotation direction of the pulley motor 63. When the holder 54 slides in the cutting direction L, the recording medium 4 is cut by the sliding blade 56 and the fixed blade 55.

The left sensor 65 and the right sensor 64 are provided at positions adjacent to the driving pulley 59 and the driven pulley 60, respectively. The left sensor 65 detects the holder 54 reaching the slide end position after the holder 54 slides in the sliding direction L, and outputs a detection signal. On the other hand, the right sensor 64 detects the holder 54 reaching the slide start position after the holder 54 slides in the returning direction R, and outputs a detection signal.

The optical fiber 40 has terminals 40*a*, 40*b*. The terminal 40*a* is attached to the left side surface of the holder 54 which is facing in the cutting direction L such that a light beam is emitted from the terminal 40*a* in a downward direction perpendicular to the sheet surface of the recording medium 4. With this configuration, when the holder 54 slides in the cutting direction L, the terminal 40*a* also moves ahead of the holder 54 while exposing the recording medium 4 with a light beam, thereby forming an exposed cutting portion on the recording medium 4. It should be noted that a width of the exposed cutting portion should be as small as possible in order to minimize the waste amount of wasted recording medium 4. However, the width has to be wide enough for preventing unexposed microcapsule 32 outside of the exposed cutting portion from being ruptured because of a mechanical stress applied by the fixed blade 55 and the sliding blade 56. The optical fiber 40 has a length long enough for allowing the terminal 40*a* to move along with the holder 54. The terminal 40*b* is connected to a light source 42 which is provided in a dead space defined in the casing 2.

Figure 6:
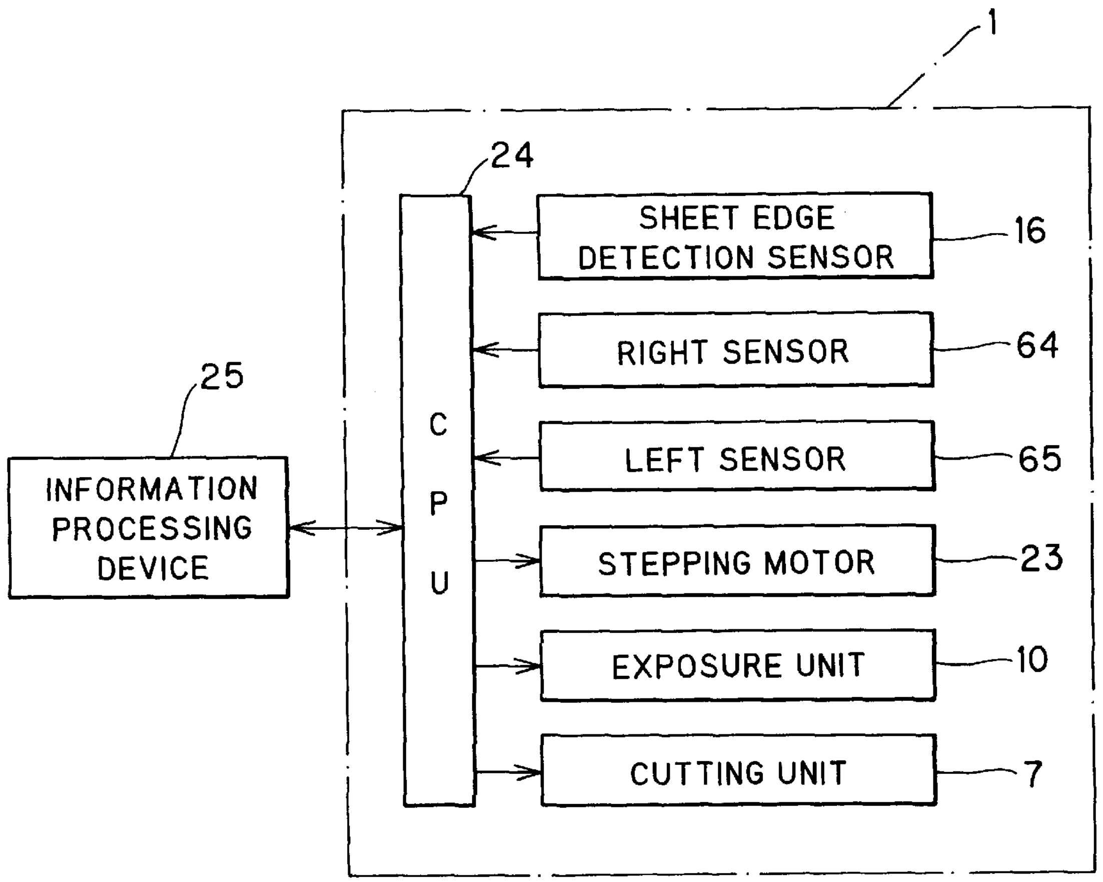
FIG. 6 is a block diagram of a control unit of the printer of FIG. 2.

As shown in FIG. 6, the printer 1 further includes a central processing unit (CPU) 24 for controlling various processes. The CPU 24 includes an input/output portion, a data communication portion, a calculation portion, a memory portion, and the like. The input/output portion is connected to the sheet edge detection sensor 16, the right sensor 64, the left sensor 65, the exposure unit 10, the stepping motor 23 and the cutting unit 7. The data communication portion is connected to an external information processing device 25. The memory portion includes a recording region for storing a print control routine, control data, print data, such as image data and character data, and control calculation data. The calculation portion executes the print control routine for cutting the recording medium 4 into a predetermined output size, in a manner to be described later, and for forming an image on the recording medium 4.

Next, operation of the printer 1 will be described while referring to FIGS. 2 and 4 to 7. When the CPU 24 receives an image forming command from the information processing device 25, the CPU 24 confirms that the holder 54 of the cutting unit 7 is located at the sliding start position based on a detection signal from the right sensor 64. Then, the stepping motor 23 drives the pair of feed rollers 5*a*, 5*b* to rotate, thereby drawing the recording medium 4 out of the cassette 3 and transporting in the feed direction F. When the sheet edge detection sensor 16 detects a leading edge of the recording medium 4, the stepping motor 23 controls to transport the recording medium 4 for a predetermined pulses' amount so that the recording medium 4 has an output length between the leading edge and the cutting position of the cutting unit 7.

Figure 7:
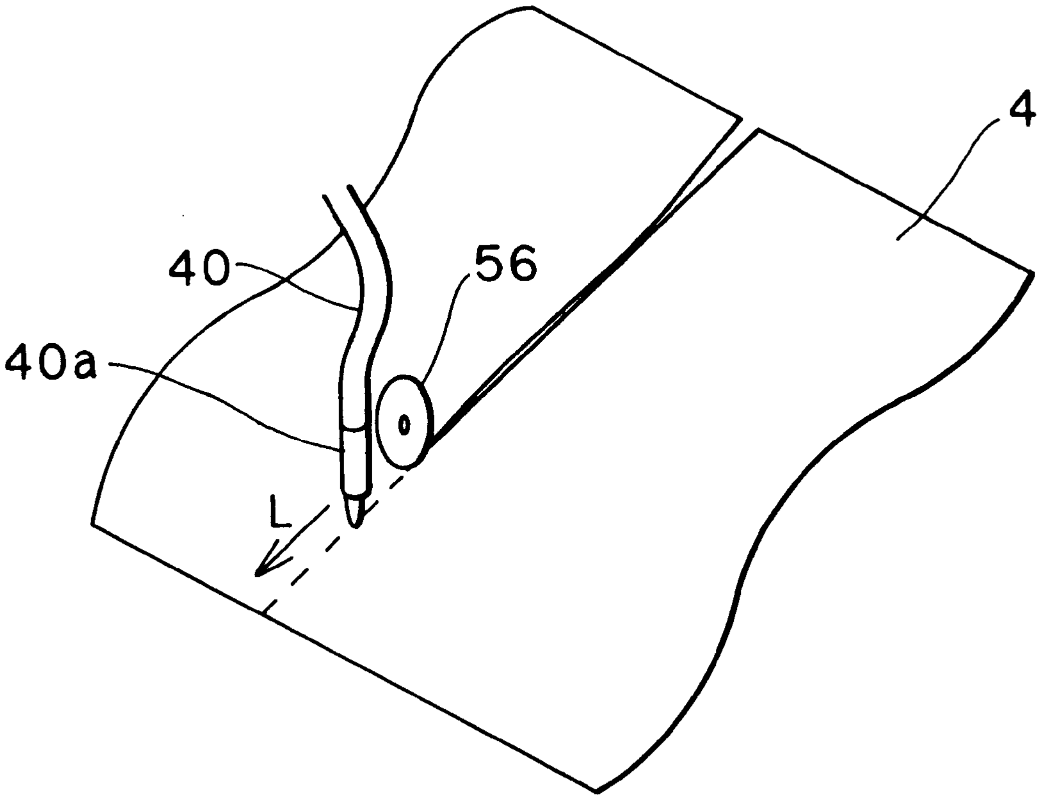
FIG. 7 is a perspective view schematically showing a cutting operation of the cutting unit of FIG. 4.

Next, the light source 42 is turned ON for emitting a light beam through the one terminal portion 40*a* of the optical fiber 40. The reversible motor 63 drives the driving pulley 59 to rotate. The driving force is transmitted via the wire 61 to slide the holder 54 in the cutting direction L. Accordingly, the one terminal portion 40*a* of the optical fiber 40 and the sliding blade 56, which are attached to the holder 54, are also moved in the cutting direction L. At this time, as shown in FIG. 7, the one terminal portion 40*a* of the optical fiber 40 moves ahead of the sliding blade 56 while exposing a light beam to a cutting portion of the recording medium 4. As a result, the microcapsules 32 at the exposed cutting portion are all hardened. Then, as the cutting blade 56 slides along the exposed cutting portion, the sliding blade 56 and the fixed blade 55 apply a shear stress on the exposed cutting portion, thereby cutting the recording medium 4 at the exposed cutting portion.

In this way, even if mechanical stress is applied to the microcapsules 32 in the cutting position at the cutting operation, because the microcapsules 32 within the range of the mechanical stress have all hardened, the microcapsules 32 will not be ruptured.

When the left sensor 65 detects the holder 54 at the slide end position, the CPU 24 confirms that the recording medium 4 has been completely cut, and controls the holder 54 to stop sliding. In this way, the recording medium 4 is cut down into the predetermined output size.

Next, the CPU 24 controls the transport belt 6 to rotate so as to transport the recording medium 4. When the recording medium 4 reaches the exposing position, the transport belt 6 stops transporting, and the transport belt 6 is moved toward the pressing glass 8. As a result, the recording medium 4 is pressed against the pressing glass 8 and kept in a flat condition. It should be noted that the holder 54 is returned to the sliding start position by sliding in the returning direction R by the time the next cutting operation is performed.

Next, print data, such as image data and character data, received from the information processing device 25 is output to the liquid crystal panel 13, and the liquid crystal panel 13 forms an exposure image based on the print data. Then, the exposure unit 10 is turned ON to radiate white light. The white light is condensed by the condenser lens 12, formed into an optical image corresponding to the exposure image by the liquid crystal panel 13, and then, formed into an optical image of, for example, a blue light component by penetrating through the blue color filter. Subsequently, the optical image of the blue light component reaches and exposes the recording medium 4 through the pressing glass 8. Then, the microcapsules 32Y are hardened, thereby forming a latent image corresponding to the optical image of the blue light component in the recording medium 4.

Then, latent images corresponding to optical images of the red and green light components are formed in the recording medium 4 in the same manner. It should be noted that when the image includes an image region and a frame region, the information processing device 25 previously performs image data processing operation for adding white frame data for forming a white frame latent image around the image region, so that all of the microcapsules 32 in the frame region are hardened. In order to avoid unnecessarily waste of the recording medium 4, the white frame region should include the exposed cutting portion which has been exposed by the optical fiber 40.

Then, the transport belt 6 releases the recording medium 4 from pressing against the pressing glass 8, and starts rotating to transport the recording medium 4 with the latent image formed thereon to the developing unit 19. At the developing unit 19, the recording medium 4 is transported while sandwiched between the pair of pressing rollers 19*a*, 19*b*. Unhardened microcapsules 32 are ruptured and developed. Next, the fixing unit 20 thermally fixes the developed image in the recording medium 4. Then, the recording medium 4 is discharged through the discharge port 2*a* onto the discharge tray 22.

According to the first embodiment described above, when the recording medium 4 is cut by the sliding blade 54 of the cutting unit 7, the optical fiber 40 moves ahead of the sliding blade 56 while exposing a cutting position of the recording medium 4 with a light beam. Therefore, a width of the exposing portion can be determined without taking a sheet feed accuracy into consideration. The width of the exposed cutting portion can be minimized, thereby minimizing waste of the recording medium 4.

Further, because the exposure operation and the cutting operation are performed simultaneously, time required to perform overall operations can be reduced. Also, because the exposure and cutting operations are performed at the same location, the image forming device can be reduced in size.

Moreover, the light source 42 is provided in a dead space defined in the printer 1. Therefore, the printer 1 can be formed even smaller.

Although, the above-described sliding blade 56 is controlled to slide in the directions L, R, which are perpendicular to the feed direction F, the sliding blade 56 can be controlled to slide any direction intersecting the feed direction F, for example, in a direction slanted with respect to the feed direction F. Also, the cutting unit 7 can be provided with a fixed blade, such as a laser blade, instead of the freely rotatable disk-shaped sliding blade 56.

Further, in the above-described first embodiment, the recording medium 4 is cut only when the holder 54 slides in the cutting direction L. However, by providing a terminal 40*a* of the optical fiber 40 on both right and left surfaces of the holder 54, the recording medium 4 can be cut when the holder 54 slides in the returning direction R also.

Figure 8:
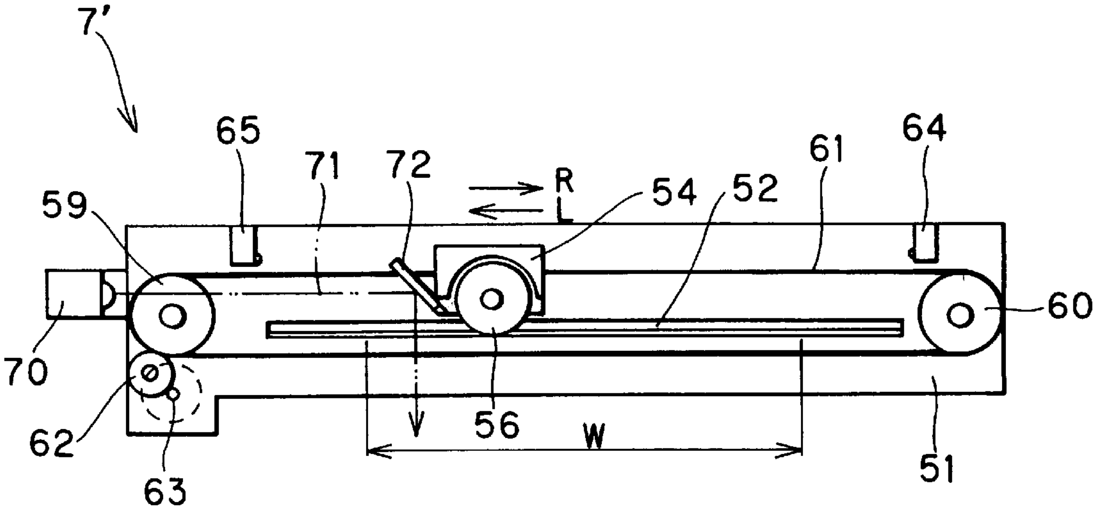
FIG. 8 is a plan view of a cutting unit according to a modification of the first embodiment.

Next, a cutting unit 7' according to a modification of the first embodiment will be described while referring to FIG. 8. As shown in FIG. 8, the cutting unit 7' is similar to the cutting unit 7. However, a laser beam source 70 is attached on a left surface of the frame 51, and a reflection mirror 72 is attached on the left side surface of the holder 54. With this configuration, a laser beam 71 radiated from the laser beam source 70 is reflected by the reflection mirror 72 toward the recording medium 4, and exposes the cutting portion of the recording medium 4.

Figure 9:
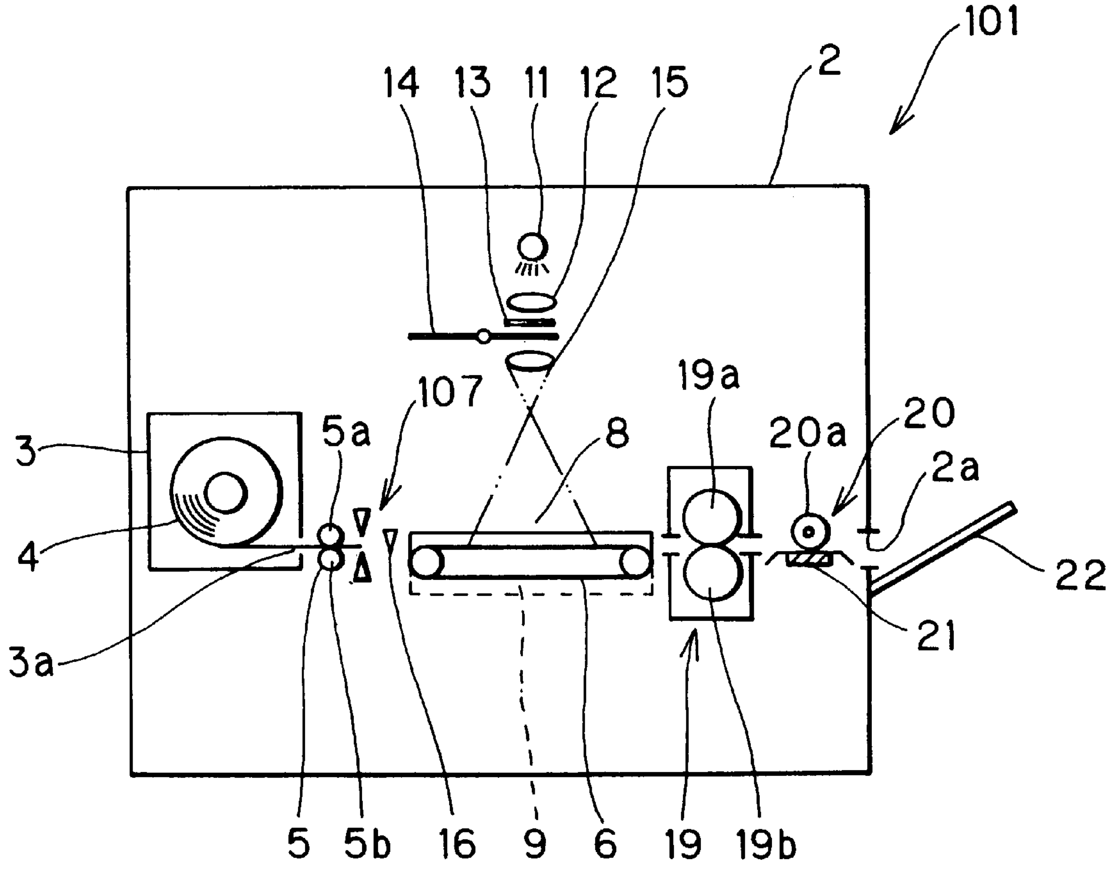
FIG. 9 is a plan view showing a configuration of a printer according to a second embodiment of the present invention.

Next, a photosensitive/pressure-sensitive printer 101 according to the second embodiment of the present invention will be described while referring to FIGS. 9 to 11. As shown in FIG. 9, the photosensitive/pressure-sensitive printer (hereinafter referred to as "printer") 101 is similar to the above-described printer 1 of the first embodiment, except that the printer 101 includes a cutting unit 107. Therefore, only the cutting unit 107 will be described to avoid a duplication of explanation.

Figure 10:
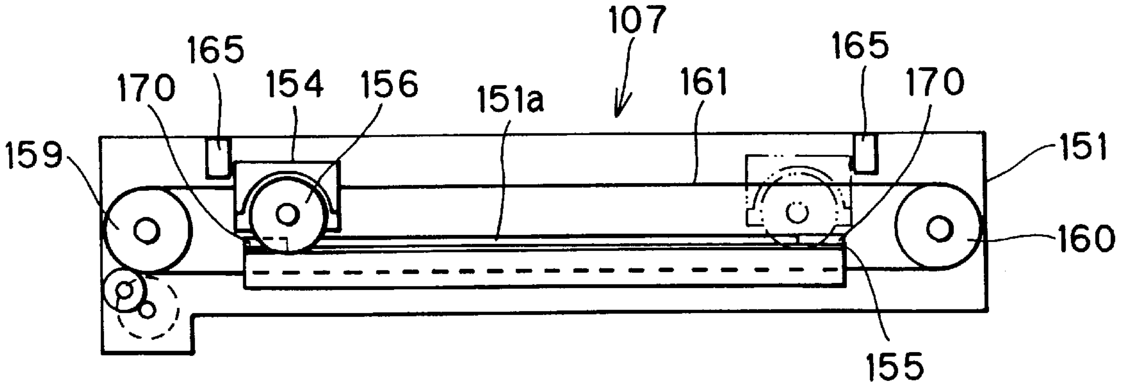
FIG. 10 is a plan view showing a cutting unit of the printer of FIG. 9.
Figure 11:
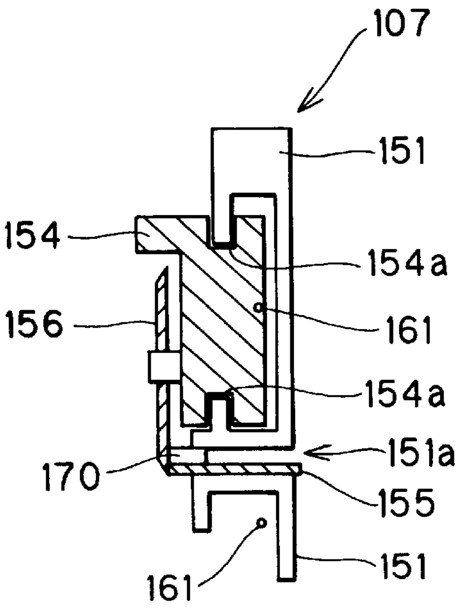
FIG. 11 is a cross-sectional view of the cutting unit of FIG. 10.
Figure 12:
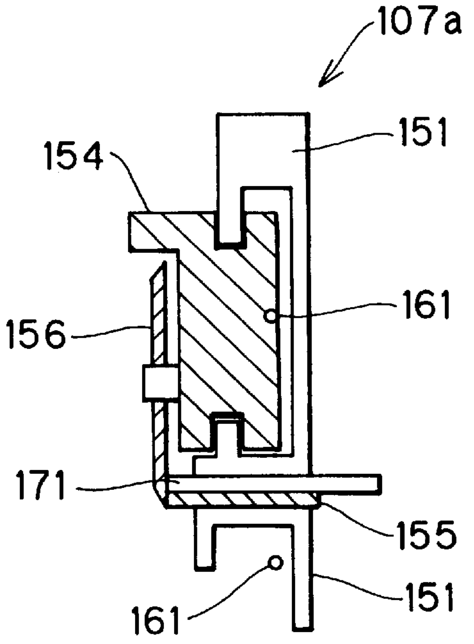
FIG. 12 is a cross-sectional view of a cutting unit according to a first modification of the second embodiment.

As shown in FIG. 10, the cutting unit 107 includes a disk shaped rotary blade 156, a rectangular fixed blade 155, a holder 154 formed with grooves 156*a*, and a frame 151 formed with a through hole 151*a*, cleaning members 170, a wire 161, a pair of rollers 159, 160, and a pair of stoppers 165.

The frame 151 extends in right and left directions. The stoppers 165 are positioned at right and left portions of the frame 151, thereby defining a moving region between the stoppers 165. The holder 154 is slidably supported by the frame 151. The pair of the rollers 159, 160 are rotatably positioned outside of the moving region. The wire 161 is wound around and extends between the pair of the rollers 159, 160. Also, a portion of the wire 161 is fixed to a rear surface of the holder 154. With this configuration, when the rollers 159, 160 rotate, the holder 154 is reciprocally moved within the moving region.

The rotary blade 156 is rotatably supported on the holder 154. The fixed blade 155 is provided in a lower surface of the through hole 151*a* of the frame 151, and extends throughout the entire moving region. An edge of the fixed blade 155 contacts a lower portion of the rotary blade 156. Therefore, when the holder 154 moves along with the rotary blade 156, the rotary blade 156 rotates because of the friction between the rotary blade 156 and the fixed blade 155. With this configuration, the recording medium 4 is cut straight when the rotary blade 156 slides in the right and left directions within the moving region.

The cleaning members 170 are provided at outsides of and near the ends of the moving region between the fixed blade 155 and an upper surface of the through hole 151*a* of the frame 151. The reason for positioning the cleaning members 170 outside of the moving region is for allowing the recording medium 4 to pass through the through hole 151_a_ without being blocked by the cleaning members 170. The cleaning member 170 is formed from foam polyurethane having a plurality open cells to have a thickness of about 1 mm, and capable of absorbing and holding liquid, such as water and oil. However, the cleaning member 170 can be formed from other materials, such as felt. When the rotary blade 156 contacts the cleaning member 170, adhesive materials clinging to the rotary blade 156 can be removed by the cleaning member 170.

Next, a cleaning operation according to the present embodiment will be described.

The cutting unit 107 cuts the recording medium 4 provided through the through hole 151_a_ of the frame 151 by sliding the rotary blade 156 in the right and left directions. At this time, adhesive materials come out of the recording medium 4 and adhere onto the rotary blade 156. However, when the rotary blade 156 reaches the end of the moving region, a lower portion of a rear surface of the rotary blade 156 contacts the cleaning member 170. At this time, the adhesive material on the rotary blade 156 is wiped off by the cleaning member 170. In this way, the rotary blade 156 can be regularly cleaned.

The cleaning member 170 can be provided at only one end of the moving region. However, it is preferable to provide the cleaning members 170 at both ends of the moving region so that the rotary blade 156 can be cleaned more often.

As described above, according to the second embodiment of the present invention, the cleaning member 170 cleans the rotary blade 156 by removing adhesive materials. Therefore, the rotary blade 156 can be prevented from being degraded because of the adhesive materials, thereby providing a durable rotary blade 156.

The cleaning members 170 are merely inserted between the frame 151 and the fixed blade 155. Therefore, the cleaning members 170 can be easily replaced when the rotary blade 156 is not in contact with the cleaning members 170.

It should be noted that the cleaning member 170 can be provided with a function for preventing the adhesive materials from attaching onto the rotary blade 156. For example, water may be applied to the cleaning member 170. In this case, upon the rotary blade 156 contacting the cleaning member 170, the water is supplied onto and forms a water film over the surface of the rotary blade 156. The water film prevents the adhesive materials from attaching onto the rotary blade 156. It should be noted that other liquid, such as oil, which is less volatile than water can form a longer lasting film on the rotary blade 156.

When the cleaning member 170 is supplied with such function, the cutting unit 107 can be further provided with a liquid supply unit for supplementing the cleaning member 170 with the liquid. The liquid supply unit can be formed in any configuration. For example, liquid can be supplied from a tank through a tube to the cleaning member 170 at a regular interval, or a member holding the liquid can be merely placed behind the cleaning member 170.

Alternatively, the cleaning member 170 can be provided with a function for applying an agent which dissolves the adhesive materials on the rotary blade 156. The agent can be, for example, methyl ethyl ketone. With this configuration, the cleaning member 170 can further effectively remove the adhesive materials from the surface of the rotary blade 156. In this case also, it is preferable to provide an agent supply unit for supplying such agent to the cleaning member 170. The agent supply unit can be configured in the same manner as the above-described liquid supply unit.

Further, the rotary blade 156 can be controlled to reciprocate so as to only be cleaned up without performing any cutting operations. Such a cleaning operation can be performed based on data received from a sensor or from a counter. The sensor can be for detecting the amount of adhesive material accumulated on the rotary blade 156. The counter can be for counting how may times an image forming operation has been performed or for measuring time elapsed since a previous cleaning operation.

Figure 13:
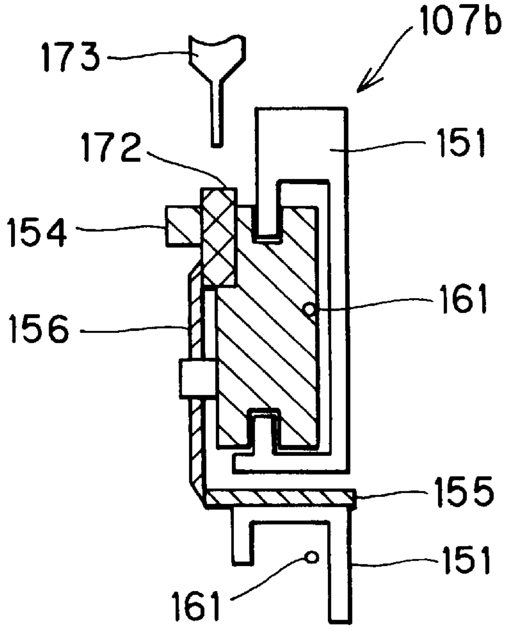
FIG. 13 is a cross-sectional view of a cutting unit according to a second modification of the second embodiment.

Next, a cutting unit 107_a_ according to a first modification of the second embodiment of the present invention will be described while referring to FIG. 13.

The cutting unit 107_a_ is similar to the cutting unit 107. However, the cutting unit 107_a_ includes a cleaning member 171 formed longer than the cleaning member 170 and protruding over the rear surface of the frame 151.

With this configuration, the cleaning member 171 can be further easily replaced with a new one. Also, in case of providing the liquid supply member described above, the liquid supply member needs not to be configured to supply liquid through the narrow through hole 151_a_. This simplifies the configuration of the cutting unit 107_a_.

Next, a cutting unit 107_b_ according to a second modification of the second embodiment will be described while referring to FIG. 13.

The cutting unit 107_b_ is similar to the cutting unit 107. However, the cutting unit 107_b_ includes a cleaning member 172 supported by the holder 154 so as to contact the upper portion of the rear surface of the rotary blade 156 all the time. The cleaning member 172 is capable of holding water, and the cutting unit 107_b_ is further provided with a water supply member 173 above the cleaning member 172 for periodically supplying water to the cleaning member 172. The cleaning member 172 can be replaced while the rotary blade 156 is dismounted from the holder 154.

Because the cleaning member 172 is supported by the holder 154, the cleaning member 172 reciprocally moves along with the holder 154 while contacting the rotary blade 156. Therefore, the cleaning member 172 can smoothly and quickly remove adhesive materials from the rotary blade 156.

It should be noted that the cleaning member 172 can hold, instead of water, an agent capable of dissolving the adhesive materials. In this case, instead of the water supply unit 173, an agent supply unit should be provided.

It also should be noted that the cleaning member 172 can be omitted so that the water supply member 173 supplies water directly to the rotary blade 156. In this case, although the rotary blade 156 cannot be cleaned by the cleaning member 173, water supplied from the water supply member 173 forms a film over the surface of the rotary blade 156. The water film can prevent adhesive materials from clinging to the rotary blade 156. Also, instead of the water supply member 173, the above-described agent supply unit can be provided for supplying the agent directly to the rotary blade 156.

Although, in the above-described second embodiment, the cutting unit 107 includes the rotary blade 156, the cutting unit 107 can include a slide cutter instead. Examples of the slide cutter will be described while referring to FIGS. 14(_a_) to 15(_b_).

Figure 14A:
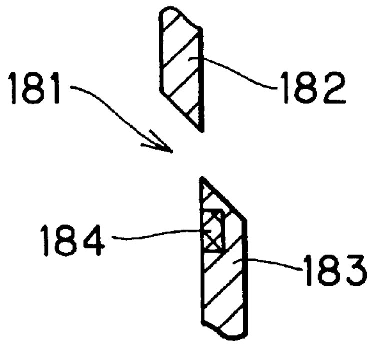
FIG. 14(*a*) is a cross-sectional view of an example of a slide cutter.
Figure 14B:
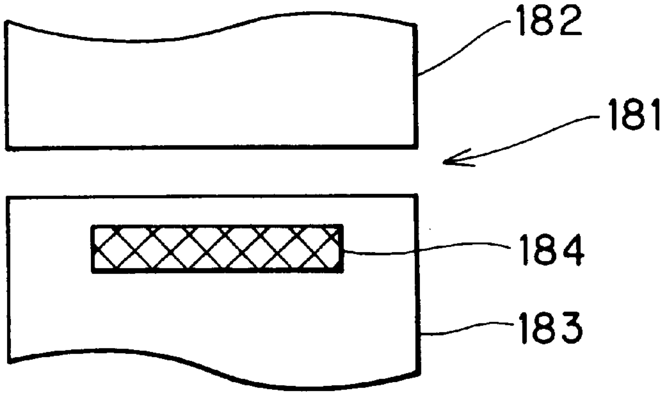

As shown in FIGS. 14(_a_) and 14(_b_), a slide cutter 181 includes a sliding upper blade 182 and a fixed lower blade 183. The lower blade 183 is provided with a cleaning member 184 formed from a polyurethane felt in a surface with which the upper blade 182 comes into contact. When the upper blade 182 comes into contact with the cleaning member 184, adhesive material can be wiped off of the upper blade 182.

Figure 15A:
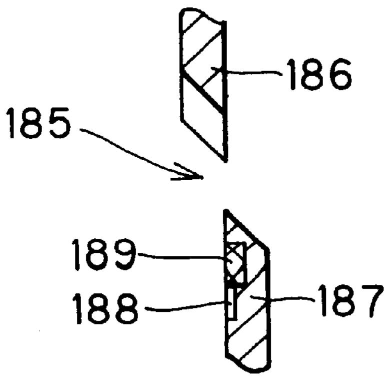
FIG. 15 is a cross-sectional view of another example of a slide cutter.
Figure 15B:
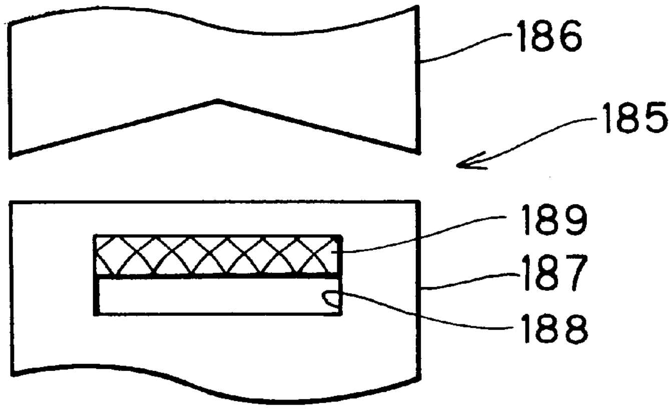

On the other hand, as shown in FIGS. 15(*a*) and 15(*b*), a slide cutter 185 includes a sliding upper blade 186 and a fixed lower blade 187. The upper blade 186 is formed in a substantial M shape, that is, with the central portion retracted back from the side portions. The lower blade 187 is provided with a cleaning member 189 in the same way as the lower blade 183 of the above-described slide cutter 181. The lower blade 187 is further formed with a groove 188 for providing an escape portion into which adhesive is collected.

It should be noted that the cutting unit 107 can any kind of blade, and is not limited to those described above.

Although, in the above-describe second embodiment, the cutting unit 107 is positioned at the upstream side of the support 9 in the feed direction F, the cutting unit 107 can be positioned at the downstream side.

Next, a photosensitive/pressure-sensitive printer 201 according to a third embodiment of the present invention will be described while referring to FIGS. 16 to 18. The photosensitive/pressure-sensitive printer (hereinafter abbreviated simply to "printer") 201 is similar to the printer 1 of the first embodiment, except that the printer 201 includes a cutting unit 207. Therefore, only the cutting unit 207 will be described in detail for avoid a duplication of explanation.

Figure 16:
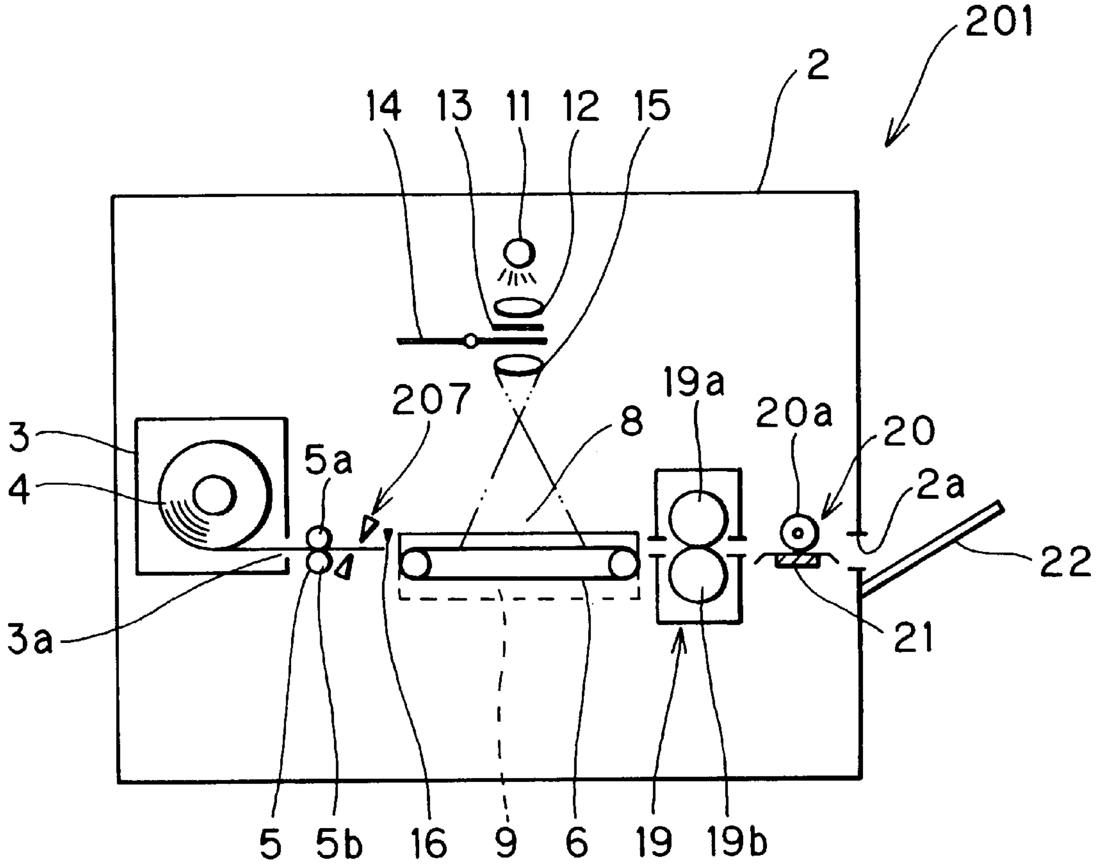
FIG. 16 is a plan view showing a configuration of a printer according to a third embodiment of the present invention.

As shown in FIG. 16, the cutting unit 207 is disposed so as to be capable of cutting the recording medium 4 at a slant with respect to the thickness direction of the recording medium 4.

Figure 17:
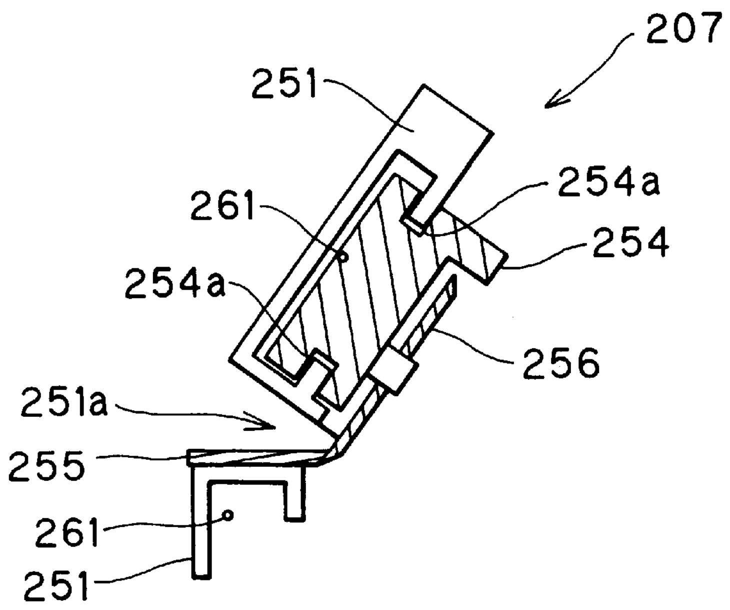
FIG. 17 is a cross-sectional view of a cutting unit of the printer of FIG. 16.

Specifically, as shown in FIG. 17, the cutting unit 207 includes a disk-shaped rotary blade 256, a rectangular fixed blade 255, a holder 254 formed with grooves 256*a*, and a frame 251 formed with a through hole 251*a*, and a wire 261.

The wire 261 is fixed to a rear surface of the holder 254, and wound around a pair of rollers (not shown). When the rollers rotate, the holder 254 is reciprocally moved within a moving region defined by a pair of stoppers (not shown).

The rotary blade 256 is rotatably supported on the holder 254. The fixed blade 255 is provided in a lower surface of the through hole 251*a* of the frame 251, and extends throughout the moving region. An edge of the fixed blade 255 contacts a lower portion of the rotary blade 256. When the rotary blade 256 moves along with the holder 254, the rotary blade 256 rotates by friction generated by the rotary blade 256 abutting against the fixed blade 255.

The fixed blade 255 is disposed in a horizontal posture. The surface of the fixed blade 255 that comes in contact with the rotary blade 256 is formed to 30 degree angle with respect to the vertical direction. On the other hand, the rotary blade 256 is supported in a slanting posture with an angle of about 30 degrees with respect to the vertical direction. With this configuration, when the rotary blade 256 is moved leftward and rightward while the recording medium 4 is positioned in the through hole 251*a* of the frame 251, the recording medium 4 is cut at a 30 degree angle with respect to its thickness direction and perpendicular to the feed direction F. Accordingly, the front and rear edges of the cut recording medium 4 form an angle of about 60 degrees. As a result, the cut recording medium 4 has a thickness that gradually increases from the leading and rear edges toward its center portion.

Figure 18:
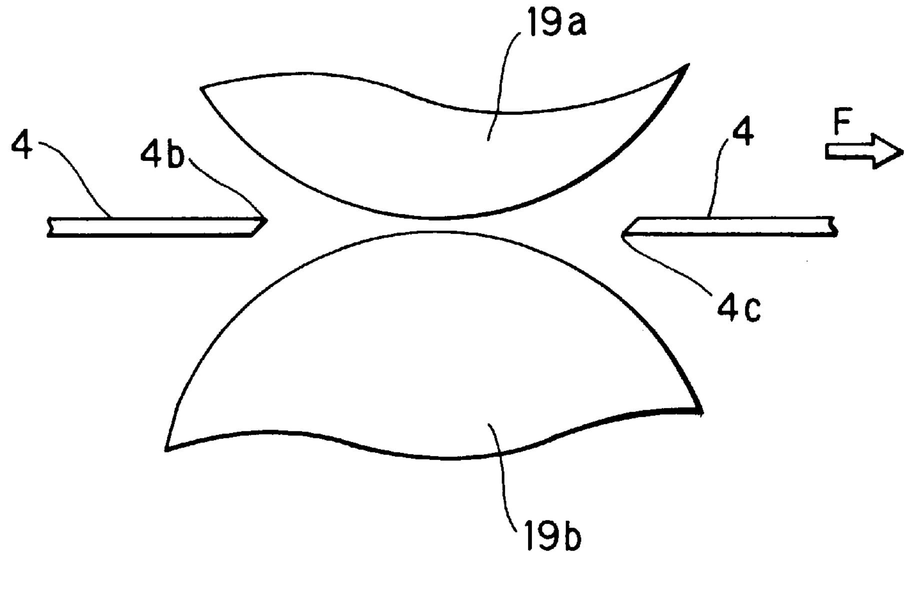
FIG. 18 is a partial side view of a developing unit with a recording medium cut by the cutting unit of FIG. 17.

As shown in FIG. 18, the recording medium 4 cut in this manner is inserted in between the pressing rollers 19*a*, 19*b* from its angled leading edge portion 4*b* and is discharged from between the pressing rollers 19*a*, 19*b* from its angled rear edge 4*c*. Accordingly, when the recording medium 4 is inserted in between the pressing rollers 19*a*, 19*b*, the recording medium 4 gradually pushes open the pressing rollers 19*a*, 19*b* while entering between the pressing rollers 19*a*, 19*b*. As a result, the pressing rollers 19*a*, 19*b* are not rapidly pressed wide open by the movement of the recording medium 4. Therefore, no large shock is applied to the pressing rollers 19*a*, 19*b*. It should be noted that the distance between the pair of pressing rollers 19*a*, 19*b* is set to about half the thickness of the recording medium 4.

The same is true when the recording medium 4 is discharged from between the pressing rollers 19*a*, 19*b*. That is, when the rear edge portion 4*c* of the recording medium 4 is discharged from between the pressing rollers 19*a*, 19*b*, the thickness of the rear edge portion 4*c* gradually decreases in the direction opposite the feed direction F. Therefore, the pressing rollers 19*a*, 19*b* gradually come closer to each other. Accordingly, the recording medium 4 is not rapidly discharged from between the pressing rollers 19*a*, 19*b*, so that no large shock is applied to the pressing rollers 19*a*, 19*b*.

The surface area of the recording medium 4 being pressed by the pressing rollers 19*a*, 19*b* is the same at the front and rear edges portion 4*b*, 4*c* as at all other portions of the recording medium 4. Therefore, the surface area of the recording medium 4 between the pressing rollers 19*a*, 19*b* does not change as the recording medium 4 is transported. Accordingly, the pressure applied per unit of surface area on the recording medium 4 only fluctuates slightly with transport of the recording medium 4. For this reason, the amount that the microcapsules 32 are ruptured is stable. Therefore, an image can be developed in the recording medium 4 without unevenness even at the front and rear edge portions 4*b*, 4*c*.

Because the thickness at the front and rear edge portions 4*b*, 4*c* of the recording medium 4 is small, only a relatively small compression energy is accumulated at the front and rear edge portions 4*b*, 4*c*. Accordingly, the recording medium 4 will not fly out from between the pressing rollers 19*a*, 19*b*. Therefore, the recording medium 4 can always be properly developed by application of sufficient pressure.

It should be noted that according to the present embodiment, the front and rear edge portions 4*b*, 4*c* are cut to form an angle of 60 degrees. However, the angle formed between the rotary blade 256 and the fixed blade 255 of the cutting unit 207 can be changed in order to optionally change angle formed by the front and rear edge portions 4*b*, 4*c*.

The angle formed at the front and rear edge portions 4*b*, 4*c* is desirably between 30 and 60 degrees for practical reason. When the angle is too large, a shock will not be sufficiently decreased. On the other hand, when the angle is too small, the front and rear edge portions 4*b*, 4*c* will be too thin at the end-most portion, so that image forming may not performed properly.

Figures 19A, 19B:
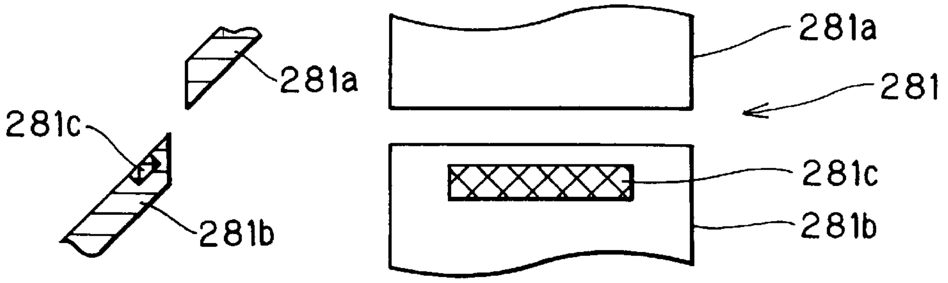
FIG. 19(*a*) is a cross-sectional view of an example of cutting unit that can be used in the printer of FIG. 16.

The above-described cutting unit 207 includes the rotary blade 256 so that the cutting unit 207 can easily and accurately cut the recording medium 4. However, any other type of cutting unit can be used. FIGS. 19(*a*) to 22(*b*) show examples of cutting unit that can be used in the printer 201.

As shown in FIGS. 19(*a*) and 19(*b*), a slide cutter 281 includes an upper movable blade 281*a* and a lower fixed blade 281*b*. Felt 281*c* is fitted in an upper surface of the fixed blade 281*b*. The felt 281*c* is formed from polyurethane for wiping off adhesive materials clinging to the movable blade 281*a*. Both the movable blade 281*a* and the fixed blade 281*b* are disposed at an angle of about 30 degrees with respect to the vertical direction. Therefore, the recording medium 4 is cut at an angle of 60 degrees at its front and rear edges.

Figures 20A, 20B:
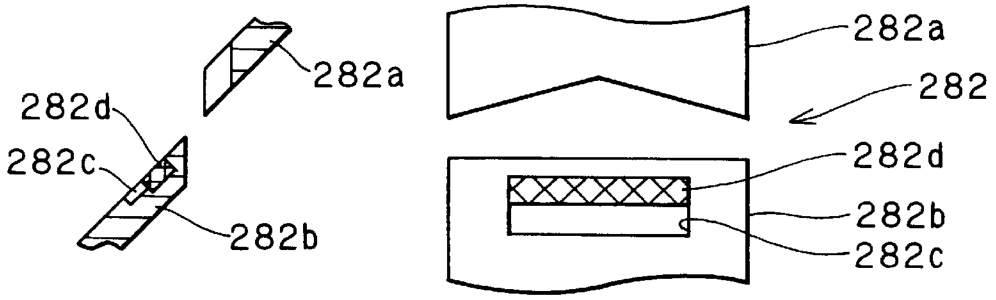
FIG. 20(*a*) is a cross-sectional view of another example of cutting unit that can be used in the printer of FIG. 16.

As shown in FIGS. 20(*a*) and 20(*b*), a slide cutter 282 includes an upper movable blade 282*a* and a lower fixed blade 282*b*. The movable blade 282*a* is formed in a substantial M shape, that is, with the central portion retracted back from the side portions. The fixed blade 282*b* is formed with a groove 282*c* in its abutment surface that comes in abutment with the movable blade 282*a*. A felt member 282*d* formed from polyurethane is fitted in the groove 282*c*. The groove 282*c* serves as a drain for removing adhesive materials collected from the movable blade 282*a* and the fixed blade 282*b*.

The movable blade 282*a* and the fixed blade 282*b* are disposed at a 30 degree angle with respect to the vertical direction. Therefore, the slide cutter 282 will cut the recording medium 4 at an angle of 60 degrees at front and rear edges.

Figures 21A, 21B:
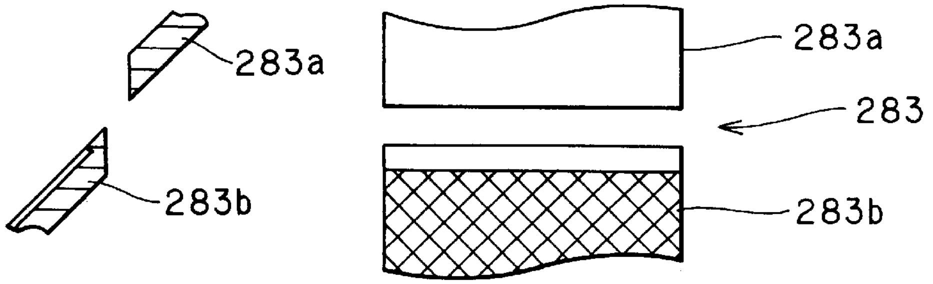
FIG. 21(*a*) is a cross-sectional view of another example of cutting unit that can be used in the printer of FIG. 16.

As shown in FIGS. 21(*a*) and 21(*b*), a slide cutter 283 includes an upper movable blade 283*a* and a lower fixed blade 283*b*. The fixed blade 283*b* has an abutment surface that is processed to form knurling for preventing the recording medium 4 from clinging to the fixed blade 283*b* by static electricity. In this example also, the movable blade 283*a* and the fixed blade 283*b* are disposed at a 30 degree angle with respect to the vertical direction. Therefore, the slide cutter 283 can cut the recording medium 4 at an angle of 60 degrees at front and rear edges.

Figures 22A, 22B:
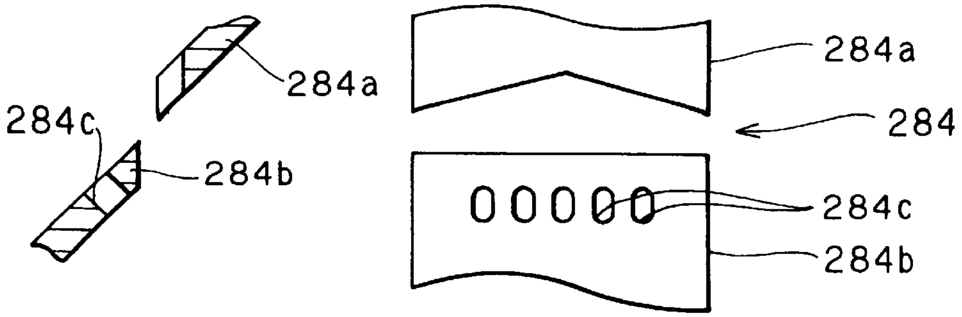
FIG. 22(*a*) is a cross-sectional view of another example of cutting unit that can be used in the printer of FIG. 16.

As shown in FIGS. 22(*a*) and 22(*b*), a slide cutter 284 includes an upper movable blade 284*a* and a lower fixed blade 284*b*. The movable blade 284*a* is formed in a substantial M shape. The fixed blade 284*b* is formed with a plurality of through holes 284*c* for preventing the recording medium 4 from clinging to the fixed blade 284*c* by static electricity. In this example also, the movable blade 284*a* and the fixed blade 284*b* are disposed to form a 30 degree angle with respect to the vertical direction. Therefore, the slide cutter 284 can cut the recording medium 4 at a 60 degree angle at its front and rear edges.

Next, a photosensitive/pressure-sensitive printer 301 according to a fourth embodiment of the present invention will be described while referring to FIGS. 23 to 29(*f*).

Figure 23:
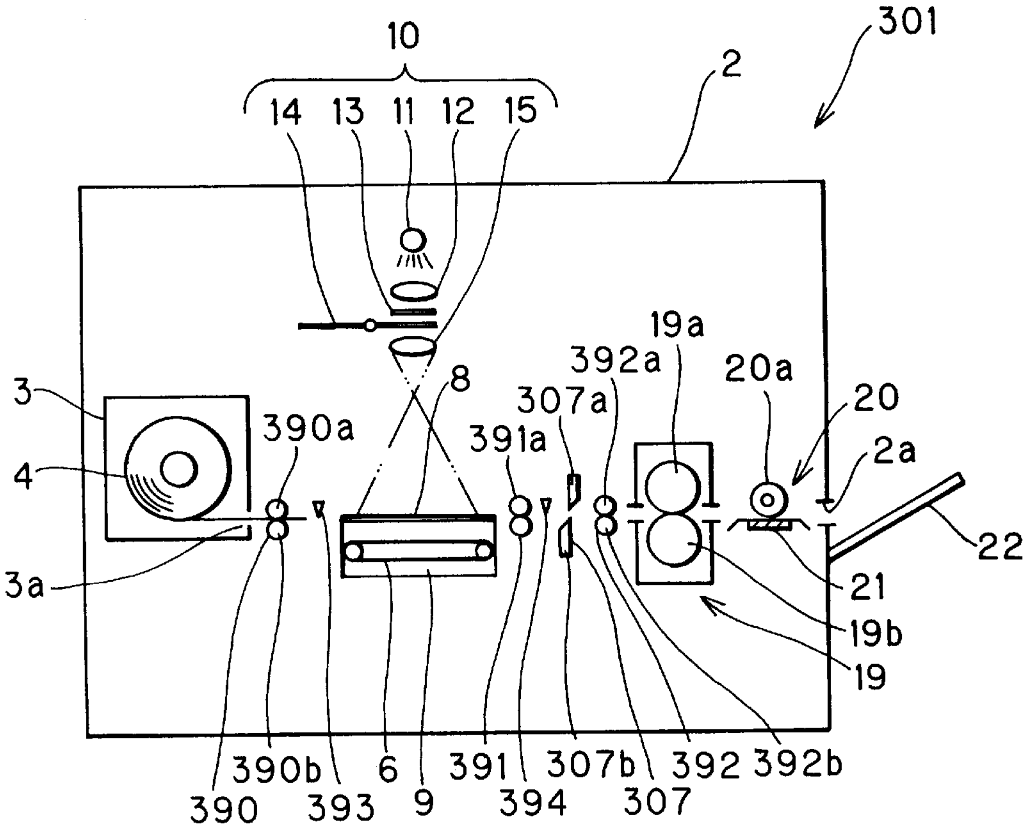
FIG. 23 is a plan view of a configuration of a printer according to a fourth embodiment of the present invention.

As shown in FIG. 23, the photosensitive/pressure-sensitive printer (hereinafter abbreviated simply to printer") 301 is similar to the above-described printer 1 of first embodiment shown in FIG. 2, and includes the cassette 3, the pressing glass 8, the transfer belt 6, the support 9, the developing unit 19, the fixing unit 20, the discharge tray 22, and the exposure unit 10. However, the printer 301 further includes a first feed unit 390, a second feed unit 391, a third feed unit 392, a first sensor 393, and a second sensor 394. The first feed unit 390 and the first sensor 393 are provided between the cassette 3 and the support 9. The second feed unit 391, the second sensor 394, the cutting unit 307, and the third feed unit 392 are provided in this order between the support 9 and the developing unit 19 in the feed direction F.

The first, second, and third feed units 390, 391, 393 include driving rollers 390*a*, 391*a*, 392*a* and driven rollers 390*b*, 391*b*, 392*b*, respectively. Each of the driving rollers 390*a*, 391*a*, 392*a* is connected to a reversible pulse motor 323 shown in FIG. 24 via a gear mechanism (not shown), and driven to rotate. The driven rollers 390*b*, 391*b*, 392*b* are pressing to the corresponding driving rollers 390*a*, 391*a*, 392*a*. With this configuration, the feed units 390, 391, 392 feed the recording medium 4 both in a normal direction, that is, the feed direction F, and a reversing direction opposite from the feed direction F.

The first sensor 393 detects the leading edge of the recording medium 4, and outputs a detection signal indicating the positional relationship between the recording medium 4 and a predetermined exposing position.

The cutting unit 307 is provided at a predetermined cutting position. The cutting unit 307 includes an upper cutting blade 307*a* and a lower cutting blade 307*b* for cutting the recording medium 4 placed between the upper and lower cutting blades 307*a*, 307*b*. The second sensor 394 detects the leading edge of the recording medium 4, and outputs a detection signal indicating a positional relationship between the recording medium 4 and the cutting position.

Figure 25:
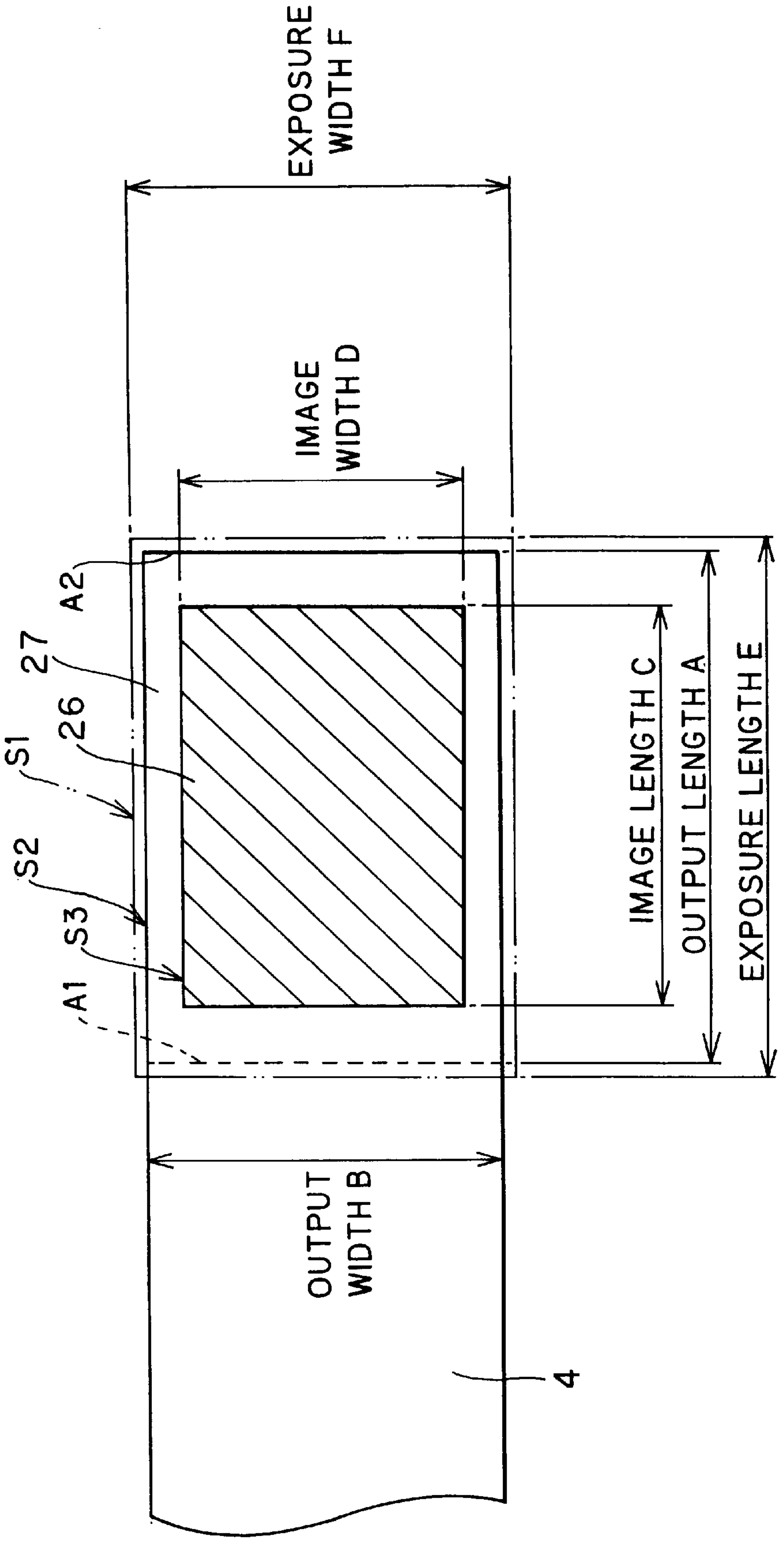
FIG. 25 is a plan view indicating image exposure areas.

It should be noted that in the present embodiment, as shown in FIG. 25, the focus lens 15 is set so that an optical image passing through the focus lens 15 forms the optical image having an exposure region S1 on an recording medium 4. The exposure region S1 should be larger than an output size S2 of the recording medium 4. That is, the exposure region S1 is set to have an exposure length E greater than an output length A and an exposure width F greater than an output width B.

Figure 24:
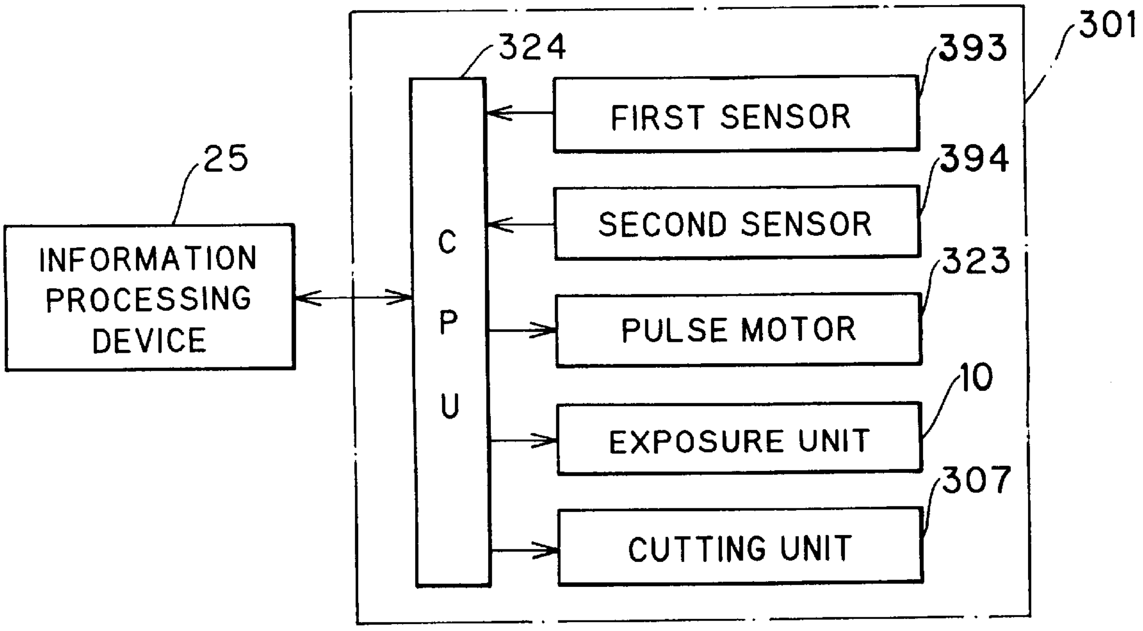
FIG. 24 is a block diagram of a control unit of the printer of FIG. 16.

As shown in FIG. 24, the printer 301 further includes a central processing unit (CPU) 324 for controlling various processes. The CPU 324 includes an input/output portion, a data communication portion, a calculation portion, a memory portion, and the like. The input/output portion is connected to the first sensor 393, the second sensor 394, the reversible pulse motor 323, the exposure unit 10, and the cutting unit 307. The data communication portion is connected to an external information processing device 25. The memory portion includes a recording region for storing a print control routine, control data, print data, such as image data and character data, and control calculation data. The calculation portion executes the print control routine for cutting the recording medium 4 into the output size S2 in a manner to be described later and forming an image on the recording medium 4.

Next, an image forming operation of the printer 301 according to the fourth embodiment will be described.

The image forming operation is started when the CPU 324 receives an image forming command from the information processing device 25. When the image forming operation is started, the CPU 324 confirms whether or not the first sensor 393 has detected the leading edge of the recording medium 4. If not, then the CPU 324 controls the pulse motor 323 to rotate the driving roller 390*a* in the normal direction to draw the recording medium 4 from the cassette 3. Then, the recording medium 4 is transported downstream toward the through hole.

Images can be outputted in the two different forms, with a white frame or without a white frame. The first type is referred to as an image with a white frame, and a second type is referred to as a total image. First, the situation for forming an image with a white frame will be explained while referring to a series of operations shown in FIGS. 27(*a*) to 27(*e*).

After the first sensor 393 detects the leading edge of the recording medium 4, the CPU 324 drives the pulse motor 323 by a predetermined number of pulses. As a result, the leading edge of the recording medium 4 is aligned at a predetermined exposure side line S2*a*. Next, the transfer belt 6 shown in FIG. 23 is moved toward the pressing glass 8 so that the recording medium 4 is pressed flat.

Next, print data inputted from the information processing device 25 is outputted on the liquid crystal panel 13 to form an exposure image. Afterwards, the light source 11 is turned ON to radiate white light. The white light is condensed by the condenser lens 12, and then formed by the liquid crystal panel 13 into an optical image corresponding to the exposure image. The optical image is then formed into an optical image of an optical component, such as, a blue light component, by the color filter of the filter member 14. After the optical image is condensed to a predetermined focal point distance by the focus lens 15, the optical image is irradiated onto the recording medium 4 through the pressing glass 8. As a result, the recording medium 4 is exposed in the exposure region S1. The microcapsules 32 are selectively hardened by reacting to the blue light component, and a latent image corresponding to the optical image is formed in the recording medium 4.

Afterwards, the filter member 14 is rotated and the color filter is changed in order to perform exposure for other optical components. As a result, latent images for each optical component are formed in order in the recording medium 4.

It should be noted that, as shown in FIG. 25, when a white frame 27 is to be formed around an image 26, the information process device 25 beforehand performs image data processes for overlapping white frame data for forming a white latent image around an image range S3. The image range S3 has an image length C and an image width D. All microcapsules 32 in the latent image are hardened to form the white frame 27.

Then, the transfer belt 6 is separated from the pressing glass 8 to release pressure against the recording medium 4, and the recording medium 4 is transported in the feed direction F. When the second sensor 394 detects the leading edge of the recording medium 4, the pulse motor 323 is driven by a predetermined number of pulses to align a cutting portion A1 of the recording medium 4, that is, a rear side line of the output region S2, with the cutting position as shown in FIG. 27(*b*).

Figure 26:
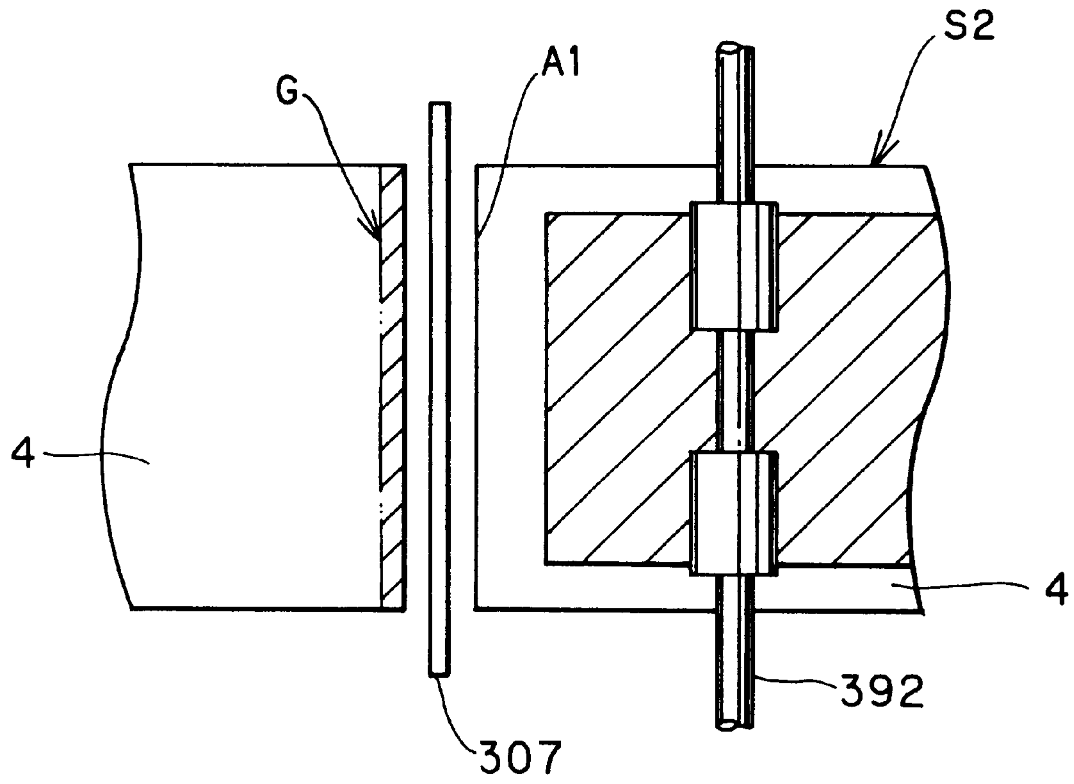
FIG. 26 is a plan view of a recording medium cut in the printer of FIG. 16.
Figure 27A:
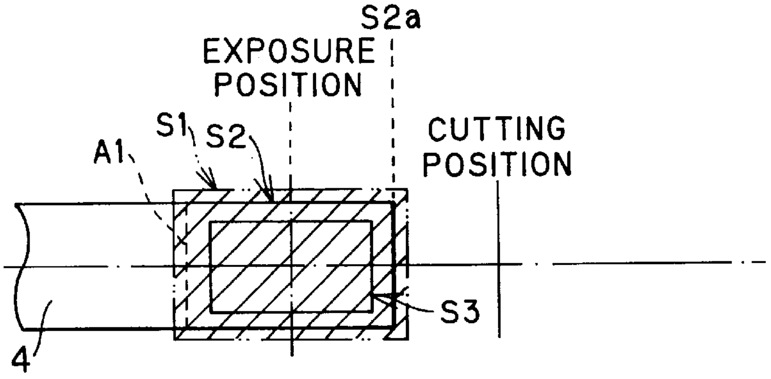
FIG. 27(*a*) is a plan view of a recording medium positioned at a through hole.
Figure 27B:
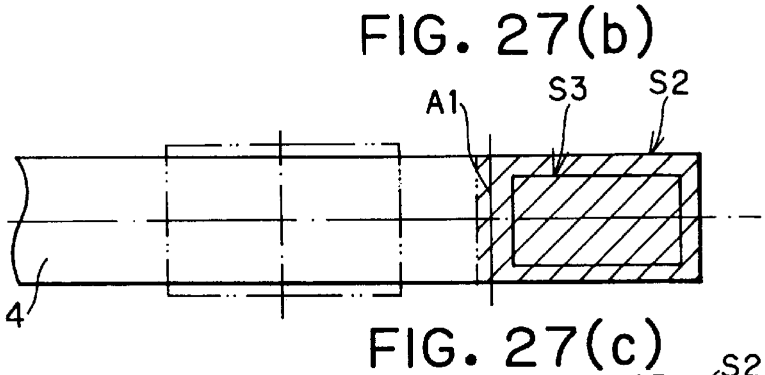
Figure 27C:
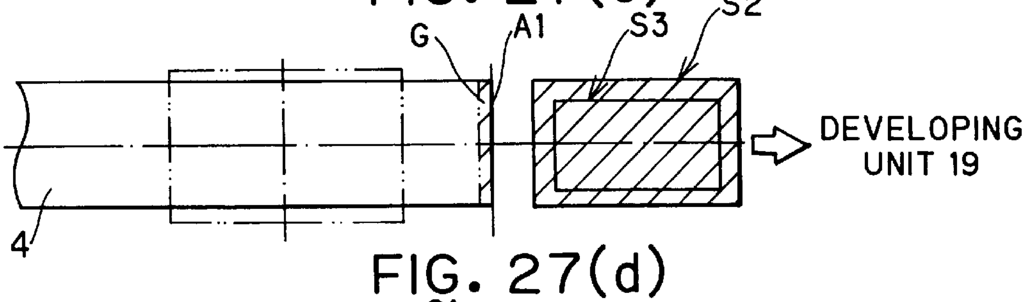
Figure 27D:
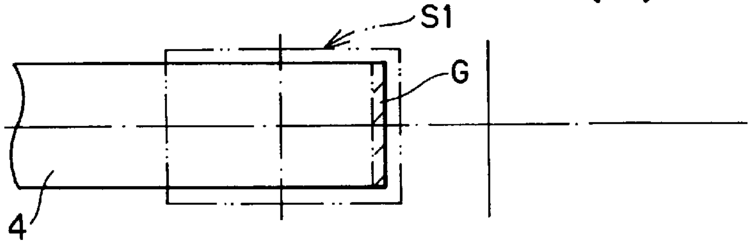
Figure 27E:
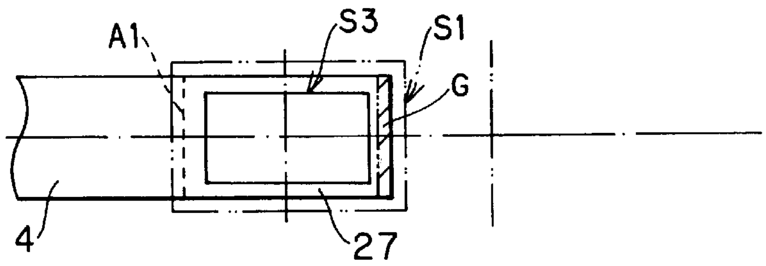
Figure 28A:
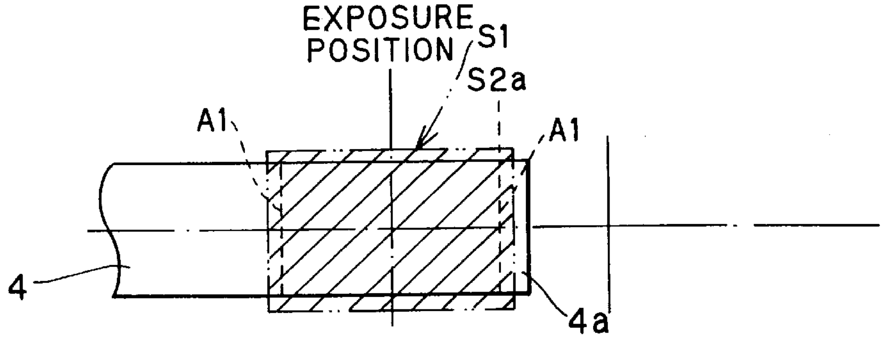
FIG. 28(*a*) is an plan view of a recording medium positioned at an through hole.
Figure 28B:
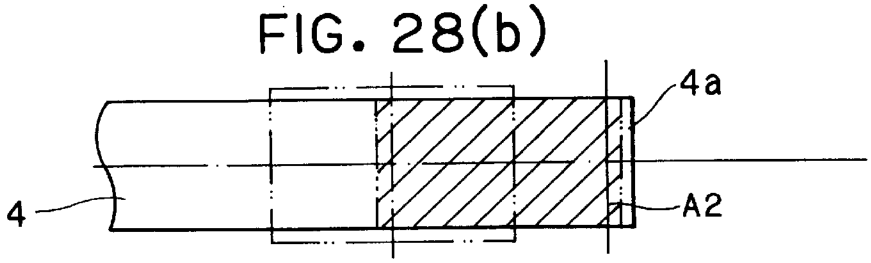
Figure 28C:
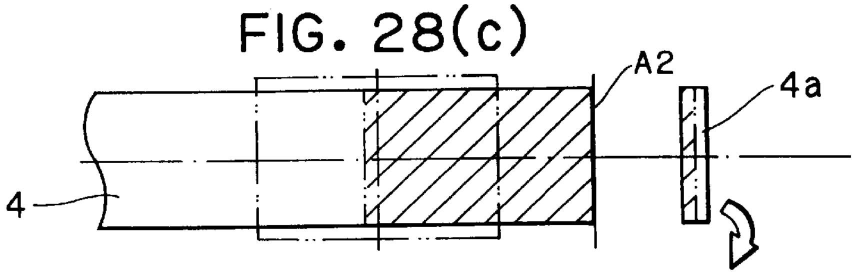
Figure 28D:
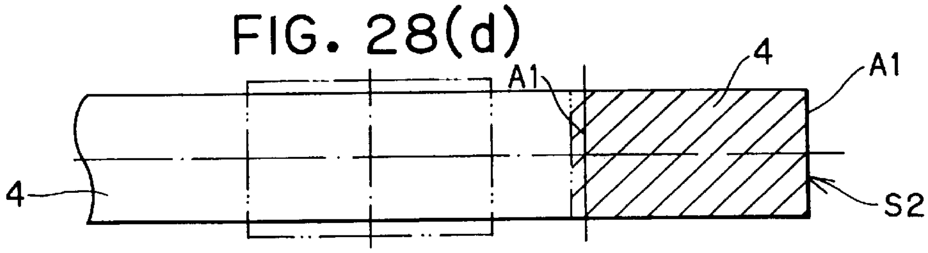
Figure 28E:
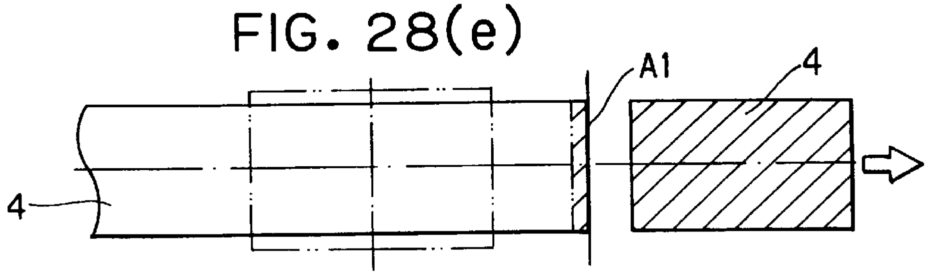
Figure 29A:
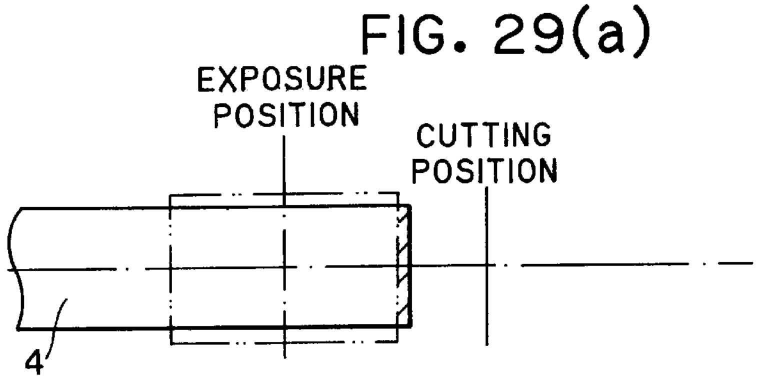
FIG. 29(*a*) is an plan view of the recording medium returned to the through hole.
Figure 29B:
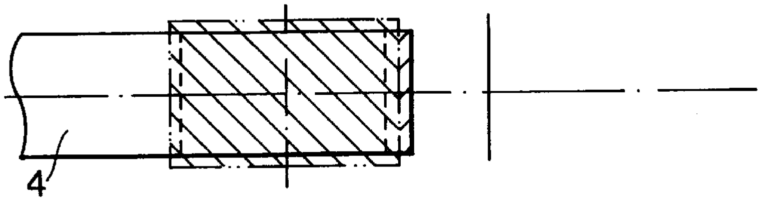
Figure 29C:
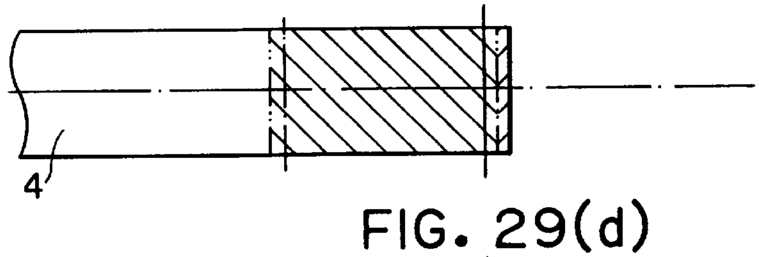
Figure 29D:
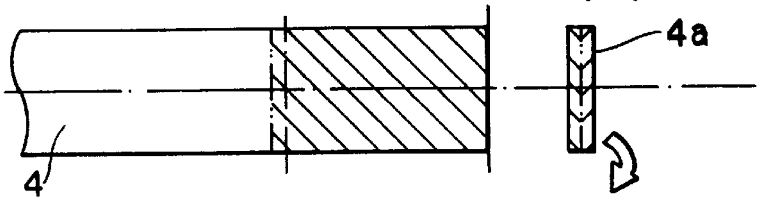
Figure 29E:
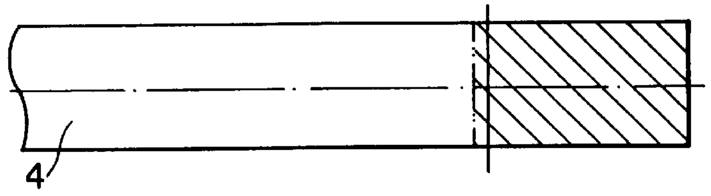
Figure 29F:
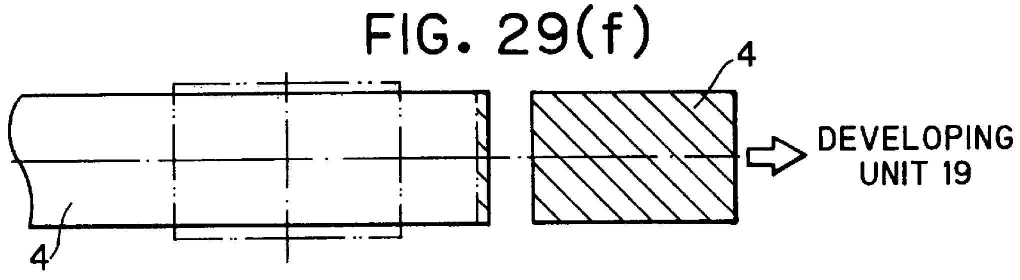

Next, as shown in FIG. 26, the cutting unit 307 is operated to cut the recording medium 4 at the cutting portion A1 to cut the recording medium 4 down to the predetermined output size S2. At this time, mechanical stress generated by the cutting operation is applied to the microcapsules 32 in the cutting portion A1. However, all of the microcapsules 32 in the cutting portion A1 had been hardened for producing the white frame 27. Therefore, non of the microcapsules 32 in the cutting portion A1 will be crushed. As a result, the cutting portion A1 will be maintained in the same color as the white frame 7 when the recording medium 4 is cut.

Next, as shown in FIG. 27(*c*), the third feed unit 392 transports the cut recording medium 4 to the developing unit 19, where an image corresponding to the latent image is developed in the recording medium 4 by rupturing unhardened microcapsules 32. Afterwards, the fixing unit 20 thermally fixes the developed image onto the recording medium 4. The recording medium 4 is, then, discharged through the discharge port 2*a* onto the discharge tray 22.

While the developing and fixing operations are being performed as described above, the third feed unit 392 is rotated to transport the recording medium in the reversing direction. When the second sensor 394 detects the leading edge of the recording medium 4, the pulse motor 323 is driven by the predetermined number of pulses so that, as shown in FIG. 27(*d*), the recording medium 4 is returned to the position where the leading edge of the recording medium 4 is aligned with the exposure side line S2*a*. Afterwards, as shown in FIG. 27(*e*), the image forming operation is performed for subsequent print data.

It should be noted that when the leading edge of the recording medium 4 is aligned to the exposure side line S2*a* as shown in FIG. 27(*e*), an edge portion G of the exposure region S1 by the previous image forming exposure overlaps the exposure region S1 for the next image exposure. However, the white frame 27 is formed on the overlapping portion, that is, the edge portion G, in the next image exposure. Therefore, image quality will not suffer. Also, because the edge portion G will not be wasted, consumption of the recording medium 4 can be reduced.

Next, an explanation will be provided for the total image without a white frame. In this case, the series of operations shown from FIG. 28(*a*) to 29(*f*) are performed.

When the first sensor 393 detects the leading edge of the recording medium 4, the CPU 324 controls the pulse motor 323 to drive the predetermined number of pulses. As a result, as shown in FIG. 28(*a*), the recording medium 4 is positioned so that the leading edge is positioned outside of the exposure region S1. Then, image exposure is performed for exposing the recording medium 4 with an image having the exposure region S1. As a result, a latent image is formed in the recording medium 4.

Afterwards, as shown in FIG. 28(*b*), the recording medium 4 is transported so that a cutting portion A2 is aligned with the cutting position. Then, as shown in FIG. 28(*c*), a waste portion 4*a* of the recording medium 4*a* is cut away. Afterwards, as shown in FIG. 28(*d*), the recording medium 4 is transported so that its cutting portion A1 aligns with the cutting position. The recording medium 4 is cut at the cutting portion A1 down into the output size S2 as shown in FIG. 27(*e*).

At this time, unhardened microcapsules 32 in the range of mechanical stress are ruptured. However, the crushed microcapsules 32 are those that are not hardened as a result of the image exposure. Therefore, the ranges of the cutting portions A1, A2 will be developed in harmony with color shades of adjacent regions.

Next, as shown in FIG. 28(*e*), the cut recording medium 4 is transported to the developing unit 19. An image corresponding to a latent image is developed at the developing unit 19, and thermally fixed in the fixing unit 20. Then, the cut recording medium 4 is discharged through the discharge port 2*a* onto the discharge tray 22.

While the developing and fixing processes are being performed as described above, the third feed unit 392 transports the recording medium 4 in the reversing direction. When the second sensor 394 detects the leading edge of the recording medium 4, the pulse motor 323 is driven the predetermined number of pulses. As a result, the recording medium 4 is returned to the through hole where the leading edge is positioned outside of the exposure region S1 as shown in FIG. 29(*a*). Afterwards, image exposure is performed as shown in FIGS. 29(*b*) to 29(*f*) in the same manner as described in FIGS. 28(*a*) to 28(*e*) when a subsequent print data is inputted.

The image forming operations for forming images with frames and images without frames were explained separately. However, by performing operations for images without frames, it is possible to output images with frames and images without frames mixed together.

The cutting unit 307 described above includes the upper and lower cutting blades 307*a*, 307*b*. However, the cutting unit 307 can include a rotating type cutter blade.

According to the above-described fourth embodiment, when an image without a frame is formed in the recording medium 4, the image portion is cut during the cutting operation. However, because the color will be in a harmony with adjacent regions, image quality will not suffer. Also, because an additional exposure unit for exposing cutting portions of the recording medium 4 is unnecessary, the printer 301 can be produced in a small size and with reduced cost. Also, the exposure operation is performed only once, the overall operation takes less time.

Also, in the printer 301, the cutting unit 307 is positioned downstream side of the exposure unit 10 in the feed direction F. Because the exposure unit 10 and the cutting unit 307 are arranged to perform the series of operations in this order, all processes are completed by transporting the recording medium 4 in a single direction, that is in the feed direction F. Accordingly process time can be reduced compared to if the recording medium 4 had to be transported backward to the cutting unit 307 after image exposure was performed by the exposure unit 10. It should be noted that the cutting unit 307 can be disposed upstream from the exposure unit 10.

According to the above-described fourth embodiment, as shown in FIG. 25, the exposure region S1 is set to be broader than the output size S2. Therefore, a desired color condition can be made in the vicinity of the cutting portions of the recording medium 4 cut down into the output size S2.

While the invention has been described in detail with reference to specific embodiments thereof, it would be apparent to those skilled in the art that various changes and modifications may be made therein without departing from the spirit of the invention, the scope of which is defined by the attached claims.

For example, in the above described embodiments, photosensitive/pressure-sensitive printers are used as examples of a photosensitive/pressure-sensitive image forming device. However, other types of photosensitive/pressure-sensitive image forming device, such as a facsimile device and a copying machine, can be used instead.

The recording medium 4 of the embodiment is formed from a single sheet containing both coreactant and microcapsules 32 wherein the microcapsules 32 contain a dye precursor and which are ruptured by a pressure. However, this is not a limitation of the present invention. For example, the recording medium 4 can include microcapsule that has a strength reduced by exposure. Further, other well known photosensitive/pressure-sensitive recording media can be used.

Also, instead of the roll of the recording medium 4, microcapsule sheets in a stacked condition can be used as long as they have an elongated length.

What is claimed is:

1. An image forming device comprising:

an image forming unit;

a cutting unit that cuts a recording medium, the cutting unit comprising a frame extending in a first direction, a holder supported on the frame and reciprocally movable along the frame within a moving region defined by a first end and a second end, and a rotary blade rotatable mounted on the holder, the rotary blade cutting the recording medium having a width in the first direction by moving along the holder while rotating; and a cleaning member that is positioned in the vicinity of the frame and cleans the cutting unit when the cutting unit comes into contact with the cleaning member, wherein the cleaning member holds an agent that is transferred to the cutting unit when the cutting unit comes into contact with the cleaning member, the agent upon being supplied to the cutting unit forming a thin film of the agent on the cutting unit and performing one of preventing a foreign material from clinging to the cutting unit and dissolving tacky material contained on the recording medium.

2. The image forming device according to claim 1, further comprising a supplement unit that supplements the agent to the cleaning member.

3. The image forming device according to claim 1, wherein the cleaning member is mounted on the holder and contacts the rotary blade such that when the holder moves along the frame, the cleaning member moves along with the holder while contacting the rotary blade to wipe off foreign materials clinging to the rotary blade.

4. The image forming device according to claim 1, wherein the cleaning member is replaceable.

5. The image forming device according to claim 1, wherein the recording medium is photosensitive/pressure-sensitive recording medium having a microcapsule which changes in a mechanical strength by reacting to light of a predetermined wavelength and which is rupturable when subject to pressure.

6. An image forming device comprising:

an image forming unit;

a cutting unit that cuts a recording medium containing an adhesive material while sliding across the recording medium, the cutting unit comprising a frame extending in a first direction, a holder supported on the frame and reciprocally movable along the frame within a moving region defined by a first end and a second end, and a rotary blade rotatable mounted on the holder, the rotary blade cutting the recording medium having a width in the first direction by moving along the holder while rotating; and a supply unit that holds one of an agent that prevents a foreign material from clinging to the cutting unit and an agent that dissolves the adhesive material contained in the recording medium, the supply unit transferring the agent onto the cutting unit when the cutting unit comes into contact with the supply unit so as to form a thin film of the agent on the cutting unit.

7. An image forming device comprising:

a transport unit that transports a photosensitive/pressure-sensitive recording medium in a first direction;

a frame extending in a second direction perpendicular to the first direction;

a cutting unit that is slidably supported on the frame and cuts down the photosensitive/pressure-sensitive recording medium by sliding along the frame; and a first exposure unit that radiates white light onto a portion of the photosensitive/pressure-sensitive recording medium, the first exposure unit being attached to the cutting unit such that when the cutting unit slides in the second direction, the first exposure unit moves with and ahead of the cutting unit while radiating the white light onto the portion of the photosensitive/pressure-sensitive recording medium.

8. The image forming device according to claim 7, further comprising a second exposure unit positioned at a downstream side of the cutting unit in the first direction, the second exposure unit radiating an optical image having a predetermined wavelength onto the photosensitive/pressure-sensitive recording medium which has been cut down by the cutting unit.

9. The image forming device according to claim 8, wherein the second exposure unit radiates the optical image in an exposure region on the photosensitive/pressure-sensitive recording medium which has been cut, the exposure region having an image region and a frame region surrounding the image region, and wherein the frame region includes the portion of the photosensitive/pressure-sensitive recording medium exposed to the white light from the first exposure unit.

10. The image forming device according to claim 7, wherein the first exposure unit comprises a light source that radiates the while light, an optical fiber having a first terminal positioned in the vicinity of the light source and a second terminal attached to the holder, wherein the white light radiated from the light source is collected by the optical fiber at the first terminal and emitted through the second terminal.

11. The image forming device according to claim 7, wherein the photosensitive/pressure-sensitive recording medium has a microcapsule that changes in a mechanical strength by reacting to light having a predetermined wavelength and that is rupturable when subject to pressure.

12. An image forming device comprising:

an image forming device;

a transporting unit that transports in a first direction a pressure-sensitive recording medium having a thickness in a second direction perpendicular to the first direction; and a cutting unit that cuts the pressure-sensitive recording medium in a third direction perpendicular to the first direction and at an angle of between 30 degrees and 60 degrees with respect to the second direction.

13. The image forming device according to claim 12, wherein the cutting unit comprises:

a frame extending in a fourth direction perpendicular to the first direction and the second direction;

a holder that is supported on the frame and movable in the fourth direction along the frame; and a rotary blade that is rotatably supported on the holder, the rotary blade cutting the pressure-sensitive recording medium by moving in the third direction along with the holder while rotating.

14. The image forming device according to claim 12, wherein the pressuresensitive recording medium is a photosensitive/pressure-sensitive recording medium including a microcapsule which changes in a mechanical strength by reacting to light of a predetermined wavelength and which is rupturable when subject to pressure.

* * * * *